US009223815B2

(12) United States Patent
Teraguchi

(10) Patent No.: US 9,223,815 B2
(45) **Date of Patent: *Dec. 29, 2015**

(54) METHOD, APPARATUS, AND PROGRAM FOR SUPPORTING CREATION AND MANAGEMENT OF METADATA FOR CORRECTING PROBLEM IN DYNAMIC WEB APPLICATION

(71) Applicant: International Business Machines Corporation, Armonk, NY (US)

(72) Inventor: Masayoshi Teraguchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/732,787

(22) Filed: Jan. 2, 2013

(65) Prior Publication Data

US 2013/0124521 A1 May 16, 2013

Related U.S. Application Data

(63) Continuation of application No. 13/629,016, filed on Sep. 27, 2012, now Pat. No. 8,935,364.

(30) Foreign Application Priority Data

Sep. 30, 2011 (JP) ................................ 2011-217999

(51) Int. Cl.

| | |
|---|---|
| ***G06F 15/16*** | (2006.01) |
| ***G06F 17/30*** | (2006.01) |
| ***G06F 11/07*** | (2006.01) |

(52) U.S. Cl.

CPC ...... *G06F 17/30312* (2013.01); *G06F 11/0709* (2013.01); *G06F 11/0748* (2013.01); *G06F 11/0775* (2013.01); *G06F 11/0793* (2013.01)

(58) Field of Classification Search

CPC .......................... H04L 29/06; H04L 29/08072

USPC ................................ 709/219; 714/2; 707/736

See application file for complete search history.

(56) References Cited

U.S. PATENT DOCUMENTS

| | | | | |
|---|---|---|---|---|
| 6,473,794 | B1 * | 10/2002 | Guheen et al. | 709/223 |
| 6,536,037 | B1 * | 3/2003 | Guheen et al. | 717/151 |

(Continued)

FOREIGN PATENT DOCUMENTS

| | | |
|---|---|---|
| JP | 2003-085087 A | 3/2003 |
| JP | 2011-022864 A | 2/2011 |

OTHER PUBLICATIONS

Vu et al, "Checking and correcting the source code of web pages for accessibility", IEEE, Computing and Communication Technologies, Research, Innovation, and Vision for the Future (RIVF), 2012 IEEE RIVF, International Conference, Feb. 27-Mar. 1, 2012.

(Continued)

*Primary Examiner* — Jerry Dennison

*Assistant Examiner* — Dixon Dabipi

(74) *Attorney, Agent, or Firm* — Scully, Scott, Murphy & Presser, P.C.; Jennifer Davis, Esq.

(57) ABSTRACT

Method to support creation and management of metadata for correcting a problem in a dynamic web application. A support apparatus includes a metadata creation section, a block extraction section, a similar-block search section, and a metadata generalizing section. In response to correction of a problem by a corrector, the support apparatus implements methods to create metadata including the details of the correction and application conditions, that is, a global variable group and cookie information that identify the state of the web application in which the problem has occurred, extracts another block to which the created metadata is applicable from an operation log by using a semantic block including the location of the problem as a clue, and generalizes the application conditions of the created metadata by converting them to a key-value pair structure by using the other block and by extracting a common portion therefrom.

11 Claims, 17 Drawing Sheets

(56) References Cited

U.S. PATENT DOCUMENTS

| | | | | |
|---|---|---|---|---|
| 6,571,282 | B1 * | 5/2003 | Bowman-Amuah | 709/219 |
| 6,714,963 | B1 * | 3/2004 | Levine et al. | 709/203 |
| 7,401,079 | B2 | 7/2008 | Itoh et al. | |
| 7,657,832 | B1 * | 2/2010 | Lin | 715/234 |
| 7,685,260 | B2 | 3/2010 | Fukuda et al. | |
| 7,809,734 | B2 | 10/2010 | Itoh et al. | |
| 8,543,908 | B2 | 9/2013 | Kawanaka et al. | |
| 8,935,364 | B2 * | 1/2015 | Teraguchi | 709/219 |
| 2002/0156799 | A1 * | 10/2002 | Markel et al. | 707/202 |
| 2003/0065645 | A1 | 4/2003 | Itoh et al. | |
| 2007/0150556 | A1 | 6/2007 | Fukuda et al. | |
| 2009/0019073 | A1 | 1/2009 | Itoh et al. | |
| 2011/0016359 | A1 | 1/2011 | Kawanaka et al. | |

OTHER PUBLICATIONS

Kawtrakul et al "A Unified Framework for Automatic Metadata Extraction From Electronic Document", Proceedings of the International Advanced Digital Library Conference, Nagoya, Japan, Aug. 25, 2005.

Alshahwan et al., "Automated Session Data Repair for Web Application Regression Testing", IEEE, Software Testing, Verification and Validation, 1st International Conference, Apr. 9-11, 2008, pp. 298-307.

Notice of Allowance dated Sep. 10, 2014, received in a related U.S. Appl. No. 13/629,016.

English Language Abstract of Japanese Patent No. JP2011-022864A, dated Feb. 3, 2011.

English Language Abstract of Japanese Patent No. JP2010-205777A, dated Nov. 4, 2010.

English Language Abstract of Japanese Patent No. JP2003-085087A, dated Mar. 20, 2003.

English Language Abstract of Japanese Patent No. JP2007-172377A, dated Jul. 5, 2007.

Shinya Kawanaka et al., "Accessibility commons: a metadata repository for web accessibility", ACM Conference on Assistive Technologies Assets, pp. 153-160, 2008.

Daisuke Sato et al., "Exploratory Analysis of Collaborative Web Accessibility Improvement", ACM Transactions on Accessible Computing, vol. 3, Issue 2, Nov. 2010.

* cited by examiner

METHOD, APPARATUS, AND PROGRAM FOR SUPPORTING CREATION AND MANAGEMENT OF METADATA FOR CORRECTING PROBLEM IN DYNAMIC WEB APPLICATION

TECHNICAL FIELD

The present invention relates to an information processing technique, and more particularly, to an apparatus, method, and program for supporting creation and management of metadata for correcting a problem in a dynamic web application.

BACKGROUND ART

To solve accessibility problems of statistic websites, there are a project (for example, Social Accessibility (SA, http://sa.watson.ibm.com/)) and a system (for example, Web Accessibility Improvement System (WAIS, http://waisdistr1.tori-info.co.jp/)) to create external metadata with the assistance of a social network and to apply it. The workflow thereof will be described herein taking the SA as an example. As shown in FIG. 1, (1) when a user 60 encounters an inaccessible Web page, (2) the user 60 first reports a problem on the Web page to a social accessibility server 65, (3) then, the social accessibility server 65 that has received the report notifies a volunteer (supporter) 70 of the problem on the Web page, and the supporter 70 confirms the notified problem on the Web page with a browser, (4) Next, the supporter 70 corrects the problem on the Web page to create metadata and sends the metadata to the social accessibility server 65, (5) finally, the user 60 browses the Web page that read the corresponding metadata from the social accessibility server 65 and is corrected using the metadata to become accessible.

The structure of the metadata that the supporter 70 creates is defined in Non-patent Literature 1 as follows:

Uniform resource identifier (URI) address: a target URI that identifies a document to which the metadata is applied Element address: a description of HTML element to which the metadata is applied (for example, XPath)

Condition: metadata application condition

Semantics: the meaning of the metadata

Techniques for applying correction information, such as metadata, to another problem are disclosed in Patent Literatures 1 to 3 and Non-patent Literature 2.

Patent Literature 1 discloses that the URI pattern is expressed by a URI including a wild card or a regular expression and that the pointer is expressed by XPath or a URI (also including a wild card or a regular expression) for indicating an image. Patent Literature 1 also discloses, as a method for extending metadata between pages, a technique for selecting metadata having the same data in a certain page, selecting analogized elements by generalizing Xpath of a plurality of items of metadata, and further selecting an element from the selected elements by using effect verification similarity and a preset threshold value. Patent Literature 1 also discloses, as a method for extending metadata between pages, a technique of selecting a page that can be evaluated in the other pages for XPath of given metadata, selecting elements to which the metadata is applicable in the selected page, and further selecting an element from the selected elements by using effect verification similarity and a preset threshold value.

Patent Literature 2 discloses a technique of accumulating results of diagnosis by a human whether accessibility of a Web page is suitable, and if the same design is found next time, showing the result of diagnosis on the basis of the previous diagnosis.

Patent Literature 3 discloses a technique of associating the description of conversion to content constituent elements of annotation data with the layout of this content constituent elements by using XPath and selecting an annotation file by determining whether the XPath can be applied to the Web content, that is, whether correct XPath is used for a group (a visual semantic block expressed in layout, such as a header, footer, link list, body, advertisement, and Web content background color) in the Web content. Patent Literature 3 further points out that the related art using a regular expression of an URL cannot cope with a case where Web content dynamically changes in layout by using a cookie or the like.

Non-patent Literature 2 discloses a technique for creating a general-purpose XPath by comparing a pair of XPaths in the viewpoint of attributes including id-expression, tag name, and index and by extracting the maximum commonality.

Patent Literature 4 is a document related to a technique for dynamically analyzing a state transition in a Web pate using DHTML, which discloses that the value of a global variable (variable defined for the entire program) in a java (a registered trademark) script can be used to acquire the state of the Web page.

CITATION LIST

Patent Literatures

[Patent Literature 1] Japanese Unexamined Patent Application Publication No. 2011-22864 (pp. 9, 12-13, FIGS. 4, 8 and 13)

[Patent Literature 2] Japanese Unexamined Patent Application Publication No. 2010-250777 (pp. 3-4)

[Patent Literature 3] Japanese Unexamined Patent Application Publication No. 2003-85087 (pp. 4-7)

[Patent Literature 4] Japanese Unexamined Patent Application Publication No. 2007-172377 (p. 5)

Non-Patent Literatures

[Non-patent Literature 1] Shinya Kawanaka, Yevgen Borodin, Jeffrey P. Bigham, Darren Lunn, Hironobu Takagi, Chieko Asakawa, "Accessibility commons: a metadata repository for web accessibility", ACM Conference on Assistive Technologies Assets, pp. 153-160, 2008

[Non-patent Literature 2] Daisuke Sato, Hironobu Takagi, Masatomo Kobayashi, Shinya Kawanaka, Chieko Asakawa, "Exploratory Analysis of Collaborative Web Accessibility Improvement", ACM Transactions on Accessible Computing, Volume 3, Issue 2, November 2010

SUMMARY OF INVENTION

Technical Problems

Consider solving various problems in a dynamic web application in which a java® script is heavily used with metadata by using the foregoing related art. In a dynamic web application, since content can differ even with the same URL, it is necessary to properly recognize the state of the dynamic web application and to efficiently extend metadata application conditions. As described above, Patent Literatures 3 and 4 describe or suggest that a global variable or cookie information can be used to recognize the state of a dynamic web application. However, they do not describe a method for extending them; the global variable and cookie information cannot be extended only by combining with a conventional metadata extension technique.

The foregoing related art does not disclose a method for detecting existing metadata applicable to a new problem and a specific method for detecting another portion in the same page or another page to which created metadata is applicable without needing a person to detect it. Thus, even if such existing metadata or another application portion is selected by a corrector, problems occur in that existing metadata that cannot be actually applied is presented and that many other application portions that are not necessary to extend application conditions of created metadata are presented.

The present invention is made in consideration of the problems in the related art. Accordingly, an object of the present invention is to provide a method, apparatus, and program for creating new metadata that is appliable to solve various problems in a dynamic web application, and extending application conditions of the new metadata, thus enhancing the reusability of the new metadata, thereby enabling efficient management thereof.

Solution to Problems

To solve the problems of the related art described above, the present invention newly defines metadata applicable to various problems in a dynamic web application. Such metadata includes operation information indicating operations for correcting the problems and application conditions related to application of the operation information. The application conditions includes address identification information that locates a problem in the Web page (condition a), a global variable group that identifies the state of the web application (condition b), cookie information that identifies the state of the web application (condition c), semantic block information including the location of the problem in the Web page (condition d), block identification information that locates the block information in the Web page when the problem has occurred (condition e), and location information that locates the problem in the block information (condition f). Here, the conditions b, c, and d are new items that are not included in the metadata structure disclosed in Non-patent Literature 1, and the conditions e and f are extensions of the element address disclosed in Non-patent Literature 1.

To generalize the application conditions of the newly defined metadata and to efficiently manage them, the present invention provides a method, having the characteristics below, for supporting creation and management of metadata. The supporting method of the present invention includes the steps of, by a computer, (a) creating metadata M1 in response to correction of a problem in a web application by a corrector, the metadata M1 including operation information indicating an operation for correcting the problem and application conditions of the operation information, and the application conditions including semantic block information including a location at which the problem has occurred in a Web page and a global variable group and cookie information that identify the state of the web application in which the problem has occurred; (b) calculating metadata, for each of one or more blocks B0 that match the block information of the metadata M1 of blocks in the Web page that has shifted during a correction operation, with reference to an operation log on the web application by the corrector, the metadata including a global variable group and cookie information that identify the state of the web application that has output the Web page including the blocks B0; and (c) converting each of the global variable groups and the cookie information acquired for the metadata M1 and the individual blocks B0 to a key-value pair structure, extracting a common portion therefrom, and updating the global variable groups and the cookie information of the metadata M1 by using the extracted common portion.

Preferably, the calculation step (b) includes the substep (b-1) of, by the computer, presenting the one or more blocks B0 that match the block information of the metadata M1 to the corrector to prompt the corrector to select blocks SB to which the operation that the operation information of the metadata M1 indicates is applicable, wherein the computer calculates metadata including the global variable group and the cookie information for each of the selected blocks SB.

More preferably, the update step (c) includes the substep (c-1) of, by the computer, extracting a key included in common in all the global variable groups or all the cookie information and extracting a key-value pair structure in which a value corresponding to the extracted key is common in all the global variable group or all the cookie information as the common portion.

Preferably, the update step (c) includes the substep (c-2) of, by the computer, further converting each of the values of the elements of an array object included in the global variable group or the cookie information to a key-value pair structure including a key for extracting the element and the value of the element.

Preferably, the update step (c) includes the substep (c-3) of, by the computer, if a value corresponding to a key included in common in all the global variable group or all the cookie information is an array object, performing the substep (c-1) on the individual elements of the array object.

Preferably, in the update step (c), the computer converts the cookie information formed of single information to a key-value pair structure in which the key and the value are the same.

Preferably, in the creation step (a), the computer obtains values for a global variable group and cookie information of a type preset in the computer as being effective in identifying the state of the web application and uses the values as the application conditions of the metadata M1.

Preferably, the method further includes the steps of, by the computer, (d) creating, in response to location of the present problem in the web application by the corrector, block information including the location of the problem and location information that locates the problem in the block information; (e) extracting matched metadata from a metadata storage section that stores metadata created in the past by using the created block information and location information as search keys and presenting the extracted metadata to the corrector to prompt the corrector to select metadata M0 that is applicable to the location of the present problem, identified in step (d); and (f) creating metadata M2 for correcting the present problem in the web application with reference to operation information of the selected metadata M0.

More preferably, the method further includes the step of, by the computer, (g) updating the existing metadata M0 by generalizing the application conditions of the existing metadata M0 by using the metadata M2.

Preferably, the method further includes the step of, by the computer, (h) calculating address information of the present Web page that the web application has output and a global variable group and cookie information that identify the state of the web application; (i) extracting matched metadata M0 from a metadata storage section that stores metadata created in the past by using the calculated address information, global variable group, and cookie information as search keys; (j)

comparing the block information of the extracted metadata M0 with a corresponding block in the Web page that the present web application has output, the corresponding block being extracted from the block identification information of the metadata M0, and if the blocks do not match, presenting the metadata M0 to the corrector to prompt the corrector to correct the metadata M0, and receiving the corrected block identification information; and (k) updating the existing metadata M0 by generalizing the block identification information of the metadata M0 by using the corrected block identification information.

The present invention has been described as a method for supporting creation and management of metadata for correcting a problem in a dynamic web application. However, the present invention can also be achieved as support program for causing a computer to execute the method and a support apparatus that is achieved by installing such a support program in a computer.

Advantageous Effects of Invention

According to an embodiment of the present invention, since metadata including a global variable group and cookie information that identify the state of the web application is created as application conditions of the metadata, a problem in the dynamic web application can be solved by using the metadata. Furthermore, according to an embodiment of the present invention, since the application conditions of the metadata further include semantic block information including the location of the problem in the Web page, another block in the Web page to which the created metadata is applicable can be found by calculation by the computer by using the block information as a clue. According to an embodiment of the present invention, since global variable groups and cookie information corresponding to a block and another block similar thereto, serving as application conditions, are each converted to a key-value pair structure, a common portion in each set of the global variable group and cookie information can be extracted, and hence, the application conditions, the global variable group and the cookie information, can be extended. Other advantages of the present invention will be understood from the descriptions of the embodiments.

BRIEF DESCRIPTION OF DRAWINGS

FIG. 3(*b*) is a diagram illustrating an HTML DOM tree structure of the screen shown in FIG. 3(*a*)

FIG. 6(*b*) is a flowchart of the latter half of the process for creating and managing metadata according to the first embodiment of the present invention.

DESCRIPTION OF EMBODIMENTS

Figure 1:
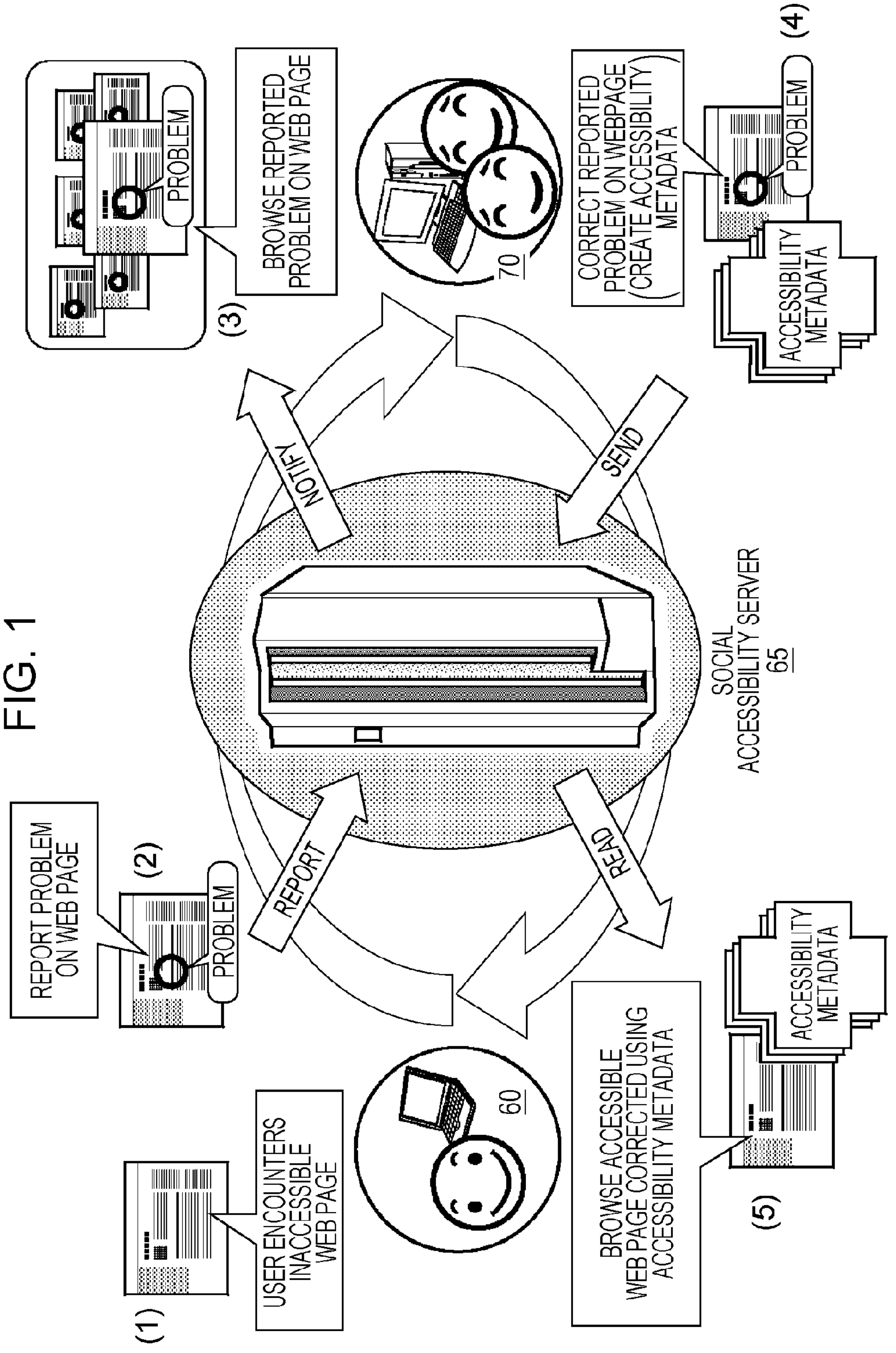
FIG. 1 is a diagram illustrating the workflow of SA.

Although embodiments of the present invention will be described in detail on the basis of the drawings, the embodiments do not limit the invention according to the claims, and all of combinations described in the embodiments are essential for the solutions of the invention. The same elements are given the same reference numerals throughout the descriptions of the embodiments.

Figure 2:
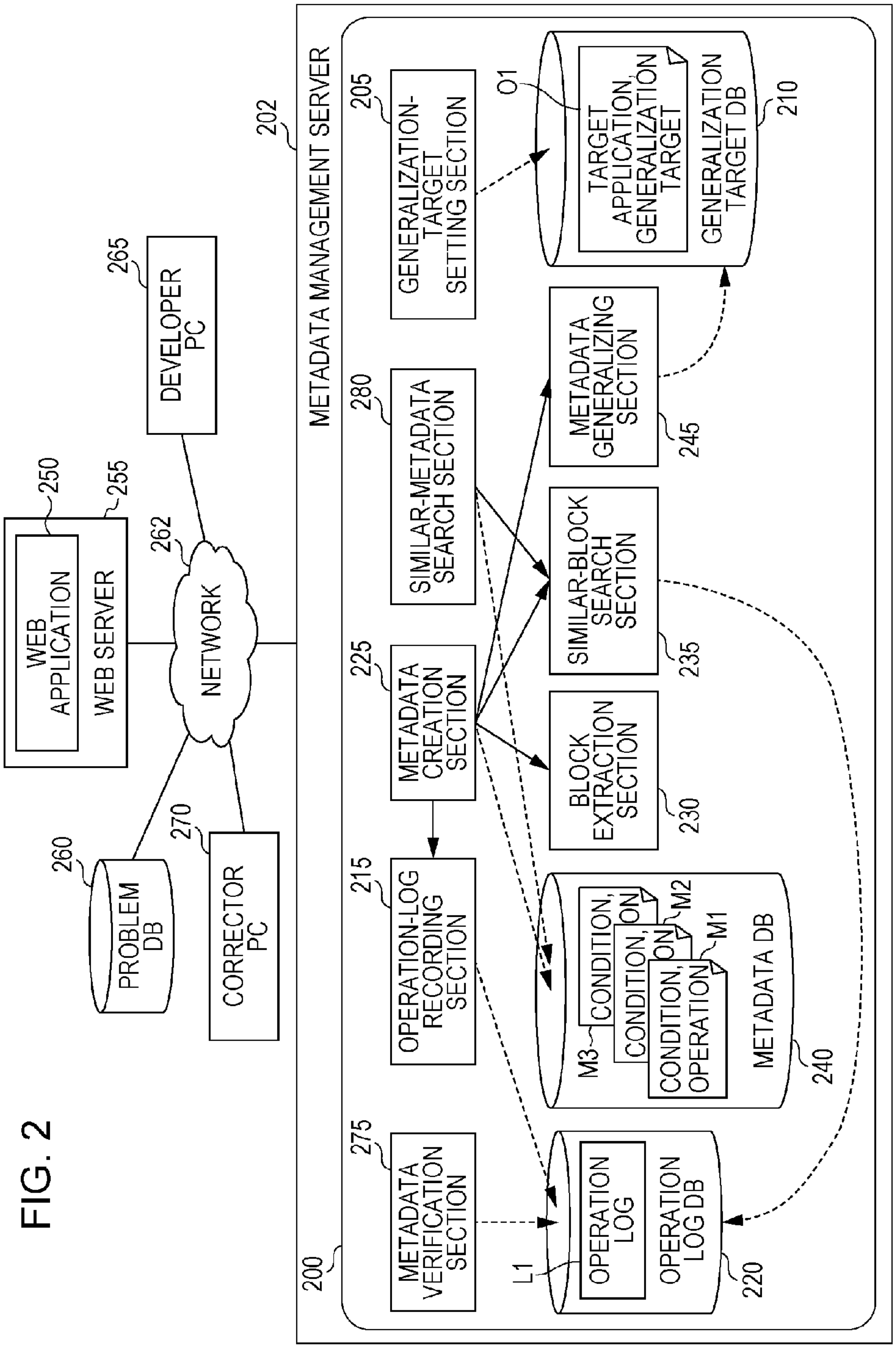
FIG. 2 is a functional block diagram of a support apparatus 200 according to an embodiment of the present invention.

FIG. 2 shows a functional block diagram of an embodiment of a network system (social accessibility system) including a computer to which the present invention is applied and a support apparatus 200 according to an embodiment of the present invention. This system includes a metadata management server 202, a web server 255, a problem database 260, a developer PC 265, and a corrector PC 270. These are connected so as to communicate with each other via a network 262, such as the Internet. The support apparatus 200 operates on the metadata management server 202, and the web application 250 operates on the web server 255.

In the present invention, almost all web applications from a simple web application that merely displays information on statistic websites on a user's web browser to a dynamic web application that dynamically updates information on the web browser without page transition by using a technique, such as java® script. Accordingly, there is no particular limitation to the kind of the web application 250 shown in FIG. 2; the web application 250 on the web server 255 of the present invention is generally referred to as a rich internet application (RIA) 250.

The present invention assumes the presence of not only the developer (developer PC 265) of the RIA 250 but also a corrector (corrector PC 270) who corrects a problem in the RIA 250. The corrector may be either a developer or a specialist or a user who has detailed technical knowledge on the RIA 250. Furthermore, the present invention assumes the presence of a problem database (DB) 260 in which problems in the RIA 250 are collected by a method that makes use of an existing technique. The problem DB 260 can be a bug tracking system, such as Bugzilla (for a detailed description, see http: //www.bugzilla.org/). The corrector accesses the RIA 250 via the network 262 by using a web browser installed in the corrector PC 270, (1) identifies the location of a problem P1 with reference to the problem P1 registered in the problem DB 260, and (2) corrects the problem P1. The result of correction is managed by the metadata management server 202 corresponding to a social accessibility server 65 of the SA.

The support apparatus 200 according to an embodiment of the present invention is started in response to such a correcting operation by the corrector and supports the corrector in creating the result of correction as metadata and generalizing and verifying the application conditions of the metadata. The support apparatus 200 is implemented on the metadata management server 202 and operates as part of the metadata management server 202. The metadata management server 202 includes an operation system that provides basic functions, a web browser, and a communication section serving as the function of communication with a plug-in of the web browser or a single application that operates on the corrector PC 270 (not shown), in addition to the components of the support apparatus 200, described later. Here, the plug-in of the web browser or the single application that operates on the corrector PC 270 supports the corrector in acquiring the operation log, presenting and selecting metadata that is applicable to solve the problem, manually solving the problem, displaying and selecting the state and the block of the RIA 250 to which the created metadata is applicable, displaying metadata that cannot be applied correctly in the present state of the RIA 250, and selecting or deleting a correct application position. The details will be described in relation to the functions of the support apparatus 200. The metadata management server 202 and the web server 255 may be implemented on the same server or may be operated on the developer PC 265 or the corrector PC 270. Furthermore, the corrector PC 270 may be equipped with a web browser (not shown) serving as a user interface to the support apparatus 200. The metadata management server 202 may be implemented as a plug-in of a web browser or a single application that operates on the corrector PC 270. The following description is made on the assumption that the metadata management server 202 and the web server 255 are implemented on the same server. In this case, the operation of the corrector related to the RIA 250 is notified to the support apparatus 200 by means of the plug-in of the web browser or the single application that operates on the corrector PC 270, described above, via the communication section of the metadata management server 202, described above, and vice versa.

More specifically, the support apparatus 200 includes a generalization-target setting section 205. The generalization-target setting section 205 enables the developer to register a global variable group and the kind of cookie information effective in identifying the state of the RIA 250 into a generalization target DB 210 via the developer PC 265 connected to the metadata management server 202 via the network 262. The support apparatus 200 further includes an operation-log recording section 215. The operation-log recording section 215 acquires operation information on the corrector PC 270 during the operation of identifying the location of problem and records the operation information on an operation log DB 220 in response to an access of the corrector to the RIA 250 to be corrected.

The support apparatus 200 further includes a metadata creation section 225, a block extraction section 230, a similar-block search section 235, and a metadata generalizing section 245. The support apparatus 200 creates metadata M1 including the details of correction on the problem P1 in accordance with the structure of metadata that is newly defined in the present invention in response to the correction of the problem P1 by the corrector, extracts another block to which the created metadata M1 is applicable from the operation log DB 220 by using a semantic block including the location of the problem P1 as a clue, generalizes the application conditions of the created metadata M1 by using the applicable block, and stores the generalized metadata M1 in the metadata DB 240 (first embodiment).

The support apparatus 200 further includes a similar-metadata search section 280. The support apparatus 200 searches the metadata DB 240 for existing metadata M0 that is applicable to the problem P1 by using a semantic block including the location of the problem P1 in response to the identification of the problem P1 by the corrector, and creates the metadata M1 for correcting the problem P1 by using the found existing metadata M0, generalizes the found existing metadata M0 by using the created metadata M1, and stores the generalized metadata M0 in the metadata DB 240 (second embodiment).

The support apparatus 200 further includes a metadata verification section 275. The support apparatus 200 searches the metadata DB 240 for the existing metadata M0 that is applicable to the state of the RIA 250 after change every time the state of the RIA 250 changes in response to a request from the corrector PC 270. When a block in the Web page in the present state of the RIA 250, which is determined depending on the application conditions of the found existing metadata M0, does not match an intended block, the support apparatus 200 prompts the corrector to correct the application conditions of the existing metadata M0, thereby updating the existing metadata M0 in the metadata DB 240 on the basis of the correction information input by the corrector (third embodiment).

The details of the components of the support apparatus 200 will be described in sequence hereinbelow with reference to first to third embodiments.

First Embodiment

The first embodiment is consistent with a scenario in which the problem P1 on the RIA 250 is newly solved while recording operation information to create the metadata M1, and the created metadata M1 is extended so as to be applicable to another portion by using the operation log. When the corrector comes up with a method for correcting the problem P1 with reference to a problem list on the RIA 250 acquired from the problem DB 260, the corrector starts the web browser and accesses the RIA 250. Then, the access is detected by the support apparatus 200 operating as part of the metadata management server 202, and the metadata creation section 225 is called. The called metadata creation section 225 monitors an operation on the RIA 250 by the corrector via the web browser and waits for the corrector to identify the state of the RIA 250 in which the problem P1 has occurred.

Here, the state of the RIA 250 is identified by the following information:

A. URL that locates an HTML document (also referred to as a Web page) that the RIA 250 outputs B. Global variable group that java® script can access on the web browser (except D, described below, and a variable that represents a function)

C. Cookie information related to the RIA 250

D. HTML document defined by a document object model (DOM)

However, there is a possibility that the state of the RIA 250 cannot be identified successfully only by simply using all information in B and C. Thus, the present invention is configured such that the generalization-target setting section 205 and the generalization target DB 210 are prepared, as described above, so that the developer can set a global variable group and the kind of cookie information, which are effective in identifying the state of the RIA 250, in the support apparatus 200 in advance.

That is, upon receiving information that indicates a global variable group and the kind of cookie information transmitted from the developer PC 265 via the network 262, the generalization-target setting section 205 stores the information in the generalization target DB 210 in association with identification information on the RIA 250 that is similarly transmitted from the developer PC 202. When the metadata creation section 225 is called, it first accesses the generalization target DB 210, and searches for information indicating a global variable group and the kind of cookie information associated with the RIA 250 that the web browser on the corrector PC accesses at present, and if the information is present, the metadata creation section 225 reads it out in a work area. The HTML document defined by DOM is hereinafter simply referred to as an HTML DOM.

When the metadata creation section 225 detects that the corrector has detected the state of the RIA 250 in which the problem P1 has occurred and has located the problem P1 from the HTML DOM in that state, the metadata creation section 225 calls the block extraction section 230 and extracts a semantic block B1 including the location of the problem P1 from the HTML DOM at the occurrence of the problem P1. The semantic block B1 including the location of the problem P1 in the HTML DOM can also be translated to a subtree including an element that is the location of the problem P1. The subtree need only include an element that is the location of the problem P1 and the size thereof is not limited. The extracted information on the block B1 is passed to the metadata creation section 225 and is temporarily stored in a work area.

When the block extraction section 230 is called by the metadata creation section 225, the block extraction section 230 divides the HTML DOM in the state of the RIA 250 in which the problem P1 has occurred into a plurality of blocks by using an existing block extraction method and extracts a block B1 including the element, which is the location of the problem P1, from the plurality of divided blocks. Here, examples of the method for extracting the block include existing techniques disclosed in J. Mahmud et al., "Csurf: A Context-Driven Non-Visual Web-Browser", Proceedings of the 16th International conference on World Wide Web, 2007 and Y. Lan, et al., "Eliminating noisy information in Web pages for data mining", Proceedings of the ninth ACM SIGKDD international conference on Knowledge (KDD'03) discovery and data mining, pp. 296-305, 2003.

A method for extracting the block B1 using the block extraction method proposed by J. Mahmud et al. will be described hereinbelow. Although the block extraction method proposed by J. Mahmud et al. extracts the block B1 not only from an HTML DOM structure but also from semantic information, a more simple method for extracting the block B1 from only an HTML DOM structure will be described. (1) An element E, which is a portion to be corrected, is identified in the HTML DOM. (2) If the element E corresponds to the root of the DOM tree, the element E itself is identified as the block B1, and the identification is finished. (3) If the element E is not the root of the DOM tree, a parent element Ep of the element E is determined. (4) Child elements of the parent element Ep are searched for. If it is determined that the parent element Ep has two or more child elements, and the similarity of the structures of the child elements is high, the parent element Ep is determined as the block B1, and the identification is finished. (5) If it cannot be determined in (4) that there is similarity between the structures of the child elements, it is determined that E=Ep, and the process returns to process (2).

There are several algorithms for determination of similarity between the structures of the child elements in process (4). Among them, this embodiment uses similarity between the attributes of the elements. For example, if child elements have the same class attribute, they are defined as elements having the same structure in the system, and thus, it can be determined that they have high similarity. If child elements have the same kind of ID attribute, it can be determined that they have high similarity because the IDs in some systems are created in accordance with certain rules. Note that description of the determination of similarity is merely an example and does not limit the use of another similarity determination technique.

Figure 3:
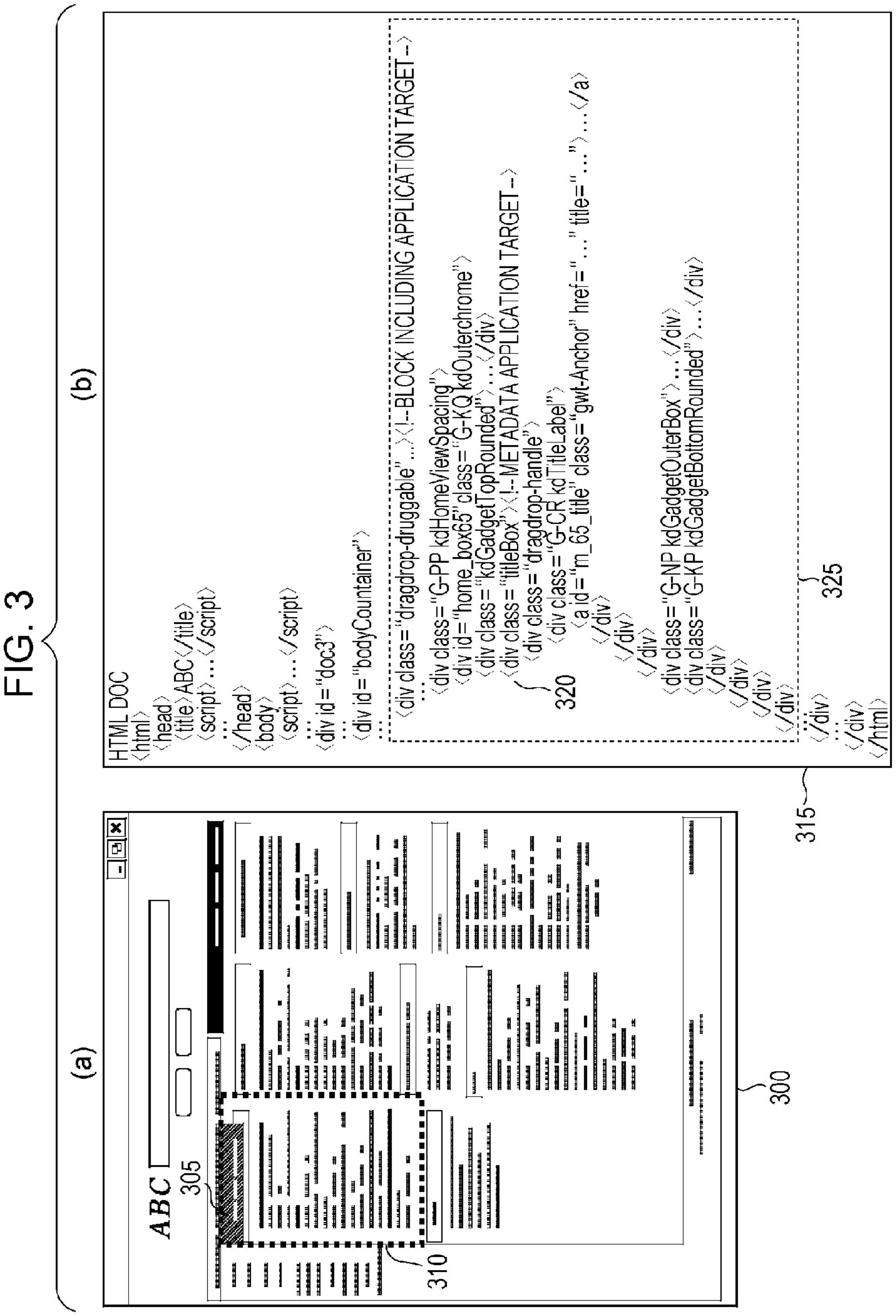
FIG. 3(*a*) is a diagram showing a TOP screen of a certain site.

The block B1 extracted by the block extraction section 230 as described above is held as a subtree of the HTML DOM in the computer. An example is shown in FIG. 3. FIG. 3(*a*) shows a TOP screen 300 of a certain site, and FIG. 3(*b*) shows an HTML DOM tree structure 315 of the TOP screen 300 shown in FIG. 3(*a*). Assuming that the problem P1 has occurred in a location enclosed by a rectangle 305 and that the block extraction section 230 has extracted the block B1 enclosed by a rectangle 310, subtree information of the HTML DOM enclosed by a rectangle 325 in FIG. 3(*b*) corresponding to the block B1 enclosed by the rectangle 310 in FIG. 3(*a*) is held as block-B1 information in the computer. The subtree information of the HTML DOM enclosed by the rectangle 325 in FIG. 3(*b*) includes the elements 320 of the subtree of the HTML DOM corresponding to the location of the problem P1 in the rectangle 305 in FIG. 3(*a*). Note that the block information does not change depending on the movement of the position since the block is expressed as a subtree of the HTML DOM everywhere it is moved.

Furthermore, the metadata creation section 225 calls the operation-log recording section 215 in response to an access to the RIA 250 to be corrected by the corrector and records an operation log L1 on the RIA 250 by the corrector until the problem P1 is located and an operation log L2 on the RIA 250 by the corrector after the problem P1 is located until the problem P1 is solved. The operation logs L1 and L2 are handled as a series of operation logs. The problem P1 may be manually solved by the corrector using a tool, such as Firebug (for a detailed description, see http: //getfirebug.com/), that provides the functions of describing, correcting and debugging websites, such as CSS, HTML, XML, DOM, and java® script. Instead of this, the problem P1 may be solved by searching existing metadata for metadata that is applicable to the present problem P1. Also in such a case, if applicable metadata is not present, the problem P1 is manually corrected by the corrector, as described above. This embodiment assumes that solution to the problem P1 is manually performed by the corrector. A solution to the problem P1 using existing metadata will be described in the second embodiment.

When the operation-log recording section 215 is called by the metadata creation section 225, the operation-log recording section 215 acquires the state of the RIA 250 and the operation log L1 of the corrector on the RIA 250 every time the state of the RIA 250 changes until the problem P1 is located and stores the state and the operation log L1 in the operation log DB 220. Furthermore, the operation-log recording section 215 acquires the state of the RIA 250 and the operation log L2 of the corrector on the RIA 250 every time the state of the RIA 250 changes after the problem P1 is located until the problem P1 is solved and stores the state and the operation log L2 in the operation log DB 220. The operation log L1 that the operation-log recording section 215 acquires includes information 1, which is all the states of the RIA 250 after the corrector accesses the RIA 250 to be corrected until the problem P1 is located, and information 2, which is location information that locates the problem P1. The operation log L2 that the operation-log recording section 215 acquires includes information 3, which is the detail of correction of the problem P1. The information 1 to 3 in the operation logs L1 and L2 will be described hereinbelow.

1. When the states of the RIA 250 that has changed during the operation of locating and correcting a problem are expressed by ASi (i=1, 2, . . . , n, n: the number of state transitions of the RIA 250), ASi is expressed by a combination of the information A to D for identifying the state of the RIA 250, described above. For the information B and information C, in the case where information indicating a global variable group and the kind of cookie information effective in identifying the state of the RIA 250 is present in the work area, the global variable group and the value of cookie information are acquired only for that kind. The operation logs L1 and L2 are used by a similar-block search section 235, described later, as a clue for finding another location to which the details of correction of the present problem P1 is applicable.
2. When the corrector locates the problem P1 on the web browser by using an input device, such as a mouse, the corrector points an element in the identified DOM with a pointer, such as XPath and a URI that indicates an image, and uses it as location information. Such information may be acquired from the web browser. Instead, description information of the problem P1 stored in the problem database 260 may be used. In this case, the description information of the problem P1 (a pointer, such as XPath indicating an element in the DOM or a URI indicating an image) is used as location information.
3. Information on an operation performed on the location of the problem P1 using an existing tool, such as Firebug, is stored as the details of correction. That is, this is operation information for correction, which includes information indicating a correction target (for example, a node of the DOM tree, attribute, or file) and the details of correction to the correction target (for example, insertion, deletion, or update, and for the insertion and update, the details of insertion and substitution). Information 2 and 3 in the operation logs L1 and L2 are used by the metadata creation section 225 that creates metadata.

When recording of the operation logs L1 and L2 by the operation-log recording section 215 ends, the metadata creation section 225 reads the operation logs L1 and L2 stored in the operation log DB 220, creates metadata M1 for the present problem P1, and stored the metadata M1 in the metadata DB 240. The data structure of the metadata M1 and a method for acquiring the data, which are newly defined in the present invention, will be described. The metadata M1 includes operation information indicating operations for correcting the problem P1 and application conditions related to application of the operation information. First, condition a to condition f serving as application conditions will be described, and thereafter, the operation information will be described. The application conditions of the metadata can be regarded as information for locating the problem P1.

Condition a: address identification information that locates the problem P1 in the Web page, that is, URL. The information is acquired as the information A included in the last state ASn of the RIA 250 in the information 1 in the operation log L1. The acquired URL is managed in the form divided into protocol, domain, folder+file, and parameter.

Condition b: a global variable group related to the RIA 250 in a state in which the problem P1 has occurred. The information is acquired as the information B included in the last state ASn of the RIA 250 in the information 1 in the operation log L1.

Condition c: cookie information related to the RIA 250 in a state in which the problem P1 has occurred. The information is acquired as the information C included in the last state ASn of the RIA 250 in the information 1 in the operation log L1.

Condition d: information on a location to which the metadata M1 is applied, that is, the block B1 including the location of the problem P. Since the information is extracted by the block extraction section 230 and is stored in the work area, as described above, the information is acquired from the work area.

Condition e: block identification information that locates the block B1 in which the problem P1 has occurred in the Web page. The information can be obtained by extracting head information of the block B1 of the condition d from the location information that indicates the location of the problem P1 in the information 2 in the operation log L1. For example, assuming that "html/body/div/table/tbody/td[3]/table/tbody/td[1]/imag" is stored in the operation log DB 220 as the location information that indicates the location of the problem P1 and that the block B1 has a table structure in td[3], the block identification information is "html/body/div/table/tbody/td[3]".

Condition f: location information that locates the problem P1 in the block B1. The information can be obtained by extracting information from the end of the information on the block B1 of the condition d to the location of the problem P1 from the location information that indicates the location of the problem P1 in the information 2 in the operation log L1. For example, assuming that "html/body/div/table/tbody/td[3]/table/tbody/td[1]/imag" is stored in the operation log DB 220 as location information that indicates the location of the problem P1 and that the block B1 has a table structure in td[3], the location information is "table/tbody/td[1]/imag".

Next, operation information that indicates operations for correcting the problem P1 will be described. The operation information is obtained using the information 3 in the operation log L2. The present invention broadly handles various problems, such as general bug fixing of a web application and localization, without specializing in accessibility problem as in the related art. Therefore, operations for locations that match the application conditions of the metadata include three kinds of operation: 1. an operation for a node in an HTML DOM, 2. an operation for an attribute of an element, 3. an operation for an external java® script, CSS.

1. In an operation for a node in an HTML DOM, one of operations, INSERT, UPDATE, and DELETE, is designated. If INSERT (based on HTML specifications) is designated as an operation, information on the node to be inserted and necessary parameters are additionally designated, and if UPDATE (based on HTML specifications) is designated as an operation, node update information is additionally designated.

2. In an operation for an attribute of an element, one of operations, INSERT, UPDATE, and DELETE, is designated as an operation. If INSERT (based on HTML specifications) is designated as an operation, a location to which the attribute is to be inserted and the name and value of the attribute are additionally designated; if UPDATE (based on HTML specifications) is designated as an operation, the name and value of the attribute to be updated are additionally designated; and if DELETE is designated as an operation, the name of the attribute to be deleted is additionally designated.

3. In an operation for an external java® script, CSS, UPDATE is designated as an operation, and the location and update history of the file to be updated (a difference displayed using an existing diff technique is sufficient) are designated.

When the metadata creation section 225 has created the thus-defined metadata M1, then the metadata creation section 225 calls the similar-block search section 235 and extracts another block to which the created metadata M1 is applicable from the operation log DB 220. The call for the similar-block search section 235 need only be made after the block serving as condition d in the metadata M1 is extracted by the block extraction section 230 and need not necessarily be made after the metadata M1 is created.

When the similar-block search section 235 is called by the metadata creation section 225, the similar-block search section 235 extracts another block to which the metadata M1 is applicable from the block operation log DB 210. The procedure is as follows. First, the similar-block search section 235 reads the information 1 in the operation log L1 from operation log DB 220 and recreates the individual states of ASi (i=1, 2, . . . , n, n: the number of transitions) of the RIA 250 that has changed during the correction operation. Secondly, the similar-block search section 235 divides the HTML DOM (information D in the operation log L1) in the recreated states ASi of the RIA 250 into a plurality of blocks BSij (j=1, 2, . . . , mi, mi: the number of divided blocks in the state ASi) using the existing block extraction method. The block extraction method is the same as that described in relation to the block extraction section 230, and the same process may be performed on all nodes from the root node in the HTML DOM tree in a given procedure, such as the order of depth priority. However, a process on a node that is once included in a certain block is skipped. This prevents the same node from being included in another block.

Then, the similar-block search section 235 compares the divided blocks BSij with the block B1, which is condition d of the metadata M1, and obtains a set of similar blocks SBk=(ASi, BSij) (k=1, 2, . . . , N, N: the number of pairs, N≤Σimi), each composed of a pair of state ASi of the RIA 250 and a block BSij similar to the block B1. If at least one block BSij similar to the block B1 is present, that is, if the set SBk of similar blocks is not empty, the similar-block search section 235 presents the obtained set SBk of similar blocks to the corrector, allowing the corrector to select similar blocks ABl (l=1, 2, . . . , M, M: the number of selected similar blocks, M≤N) to which an operation that the operation information of the metadata M1 indicates is applicable. The presentation may be made such that, for example, the similar block BSij is displayed conspicuously in the Web page in the corresponding state ASi. Condition f of the metadata M1 is directly applied to the selected block. All the blocks ABl selected by the corrector are passed from the similar-block search section 235 to the metadata creation section 225.

The determination on similarity between blocks by the similar-block search section 235 may be made using the similarity determination technique disclosed in, for example, Japanese Unexamined Patent Application Publication No. 2007-52556. With the similarity determination technique, the two structured documents to be compared are formed into the largest subtree structures each having independent meaning, the leaf node clusters of the subtrees are compared, and thus, similarity between the subtrees is determined on the basis of the ratio of the number of leaf nodes having the same content between the compared leaf node clusters. Accordingly, this embodiment allows similarity between blocks to be determined on the basis of the ratio of the number of elements or attributes of the same content between the compared blocks.

Upon receiving similar blocks ABl (l=1, 2, . . . , M), to which the operation that the operation information of the metadata M1 indicates is applicable, from the similar-block search section 235, the metadata creation section 225 creates metadata MBl (l=1, 2, . . . , M) for the individual similar blocks ABl (l=1, 2, . . . , M). Note that the similar block ABl is a pair of a block similar to the block B1 and state information on the corresponding RIA 250 and that the metadata MBl can be created from the state information on the corresponding RIA 250 and condition f of the metadata M1. The metadata creation section 225 calls the metadata generalizing section 245 and extends the metadata M1 to metadata MF that can also be applied to solve the problem of another location similar to the location of the problem P1. Then, the metadata creation section 225 updates the metadata M1 stored in the metadata DB 240 by using the metadata MF.

When the metadata generalizing section 245 is called by the metadata creation section 225, the metadata generalizing section 245 generalizes the application conditions of the metadata M1 using metadata MBl (l=1, 2, . . . , M). Note that the targets of the generalization are only conditions a, b, c, and e of the metadata M1. This is because conditions d and f are common to the metadata M1 and all the metadata MBl and are invariable. Methods for generalization will be described for the individual conditions.

Condition a, that is, a URL that locates a Web page in which a problem has occurred, is generalized in the following procedure from 1 to 5.

1. All conditions a of the metadata M1 and the metadata MBl (l=1, 2, . . . , M) are classified into protocol, domain, folder+file, and parameter. (Example 1) http: //www.trl.ibm.com/testapp01/shop01.html?style=production protocol=http, domain=www.trl.ibm.com, folder+file=testapp01/shop01.html, parameter=(style=production) (Example 2) http: //www.ibm.com/testapp02/cart01.html?style=production&item=3 protocol=http, domain=www.ibm.com, folder+file=testapp02/cart01.html, parameter=(style=production, item=3)
2. Generalize protocol. Specifically, only when the protocol is the same for all conditions a, leave the protocol as a condition. When at least one condition a including a different protocol is present, any protocol is permitted.
3. Generalize domain. Specifically, backwardly match domains of all conditions a, and leave only a common portion. That is, when at least one condition a in which the domain stops matching in the process of backward matching is present, the portion of the domain from the back to the last portion that matches for all conditions a is used as a condition. If two URLs in Example 1 and Example 2 in item 1 are present, the desired common portion is "ibm.com".
4. Generalize folder+file. Specifically, forwardly match folder+file for all conditions a, and leave only a common portion. That is, when at least one condition a in which the folder+file stops matching in the process of forward matching is present, the portion of the folder+file from the front to the last portion that matches for all conditions a is used as a condition. If two URLs in Example 1 and Example 2 in item 1 are present, the desired common portion is "testapp".
5. Generalize parameter. Specifically, extract parameter names included in common in all conditions a and check the values of the extracted parameters. Leave only a parameter whose value matches for all conditions a as a condition. If there is at least one condition a in which a parameter of different values is set, the parameter is not included in the condition. If two URLs in Example 1 and Example 2 in item 1 are present, the desired common portion is style=production.

Condition b, that is, a global variable group, is generalized by converting the individual global variables of all global variable groups that belong to the metadata M1 and the metadata MBl (l=1, 2, . . . , M) to a key-value pair structure, such as JSON, and by extracting a common portion. This will be described as follows: 1. A method for conversion to a key-value pair structure and 2. A method for extracting a common portion from all conditions b after conversion. Here, functions, XML DOM, and global variables that are subtrees thereof are excluded from the target.

1. Method for Conversion to Key-Value Pair Structure 1-1. Simple objects, such as a value and a character string, are converted to a simple key-value pair structure.

(Example 1) style="production", i=1, flag=true→"style": "production", "i": "1", "flag": "true"

(Example 2) style="production", i=3, flag=false=→"style": "production", "i": "3", "flag": "false"

1-2. An array object is converted to a key-value pair structure like a JSON array. That is, further convert each of the values of the elements of the array to a key-value pair structure composed of a key for extracting the element and the value of the element. Accordingly, for a simple array, an index is supplemented the index is used, and for an associative array, a key for extracting the element is used.

(Example 3) a={9, 5, 1}→a: {"0": "9", "1": "5", "2": "1"}

(Example 4) a={1, 5}→a: {"0": "1", "1": "5"}

(Example 5) b={style: production, i: 1, flag: true}→"b": {"style": "production", "i": "1", "flag": "true"}

(Example 6) b={style: test, i: 3, flag: false}→"b": {"style": "test", "i": "3", "flag": "false"}

1-3. A hierarchical object is converted to a key-value pair structure by handling it as an array having variable as values. The method for conversion is based on the conversion of an array object.

(Example of Java® Script)

```
function Cart( ) {
me.items = { };
me.total = 0;
}
nextId = 0;
function CartItem( ) {
me.id = "c" + nextId++;
}
var cart = new Cart( );
cart.items[0] = new CartItem( );
```

(Example 7) cart→"Cart": {"items": [{"CartItem": {"id": "1", "price": "100"}}], "total": "0"}

(Example 8) cart→"Cart": {"items": [{"CartItem": {"id": "2", "price": "100"}}], "total": "0"}

2. Method for Extracting Common Portion 2-1. All keys included in common to all conditions b are extracted, and the values of the extracted keys are checked.

2-2. In the case where the value is a simple object, such as a numerical value or a character string, only when the values are the same for all conditions b, leave the values as a condition. If at least one condition b with different values is present, the global variable of the key is not included in the condition.

2-3. In the case where the value is an array object, the elements of the array object are converted to a key-value pair structure, as described in 1-2. Accordingly, the elements are regarded as condition b, and the process returns to the process in 2-1, described above.

Assuming that a common portion is extracted from Example 1 and Example 2 in 1-1, all the keys are included in common in Example 1 and Example 2. However, for the values of the keys, only the value of "style" key is the same between Example 1 and Example 2. Accordingly, only "style": "production" is extracted as a common portion.

Assume that a common portion is extracted from Example 3 and Example 4 in 1-2. Since the value of "a" key in common in Example 3 and Example 4 is an array, the elements of the array are regarded as the conditions b. Although keys common to all the conditions b are "0" key and "1" key, only the value of "1" key is common to all the conditions b. Accordingly, only "a": {"1": "5"} is extracted as a common portion.

Assume that a common portion is extracted from Example 5 and Example 6 in 1-2. Since the value of "b" key in common to Example 5 and Example 6 is an array, the elements of the array are regarded as conditions b. Keys common to all conditions b are all the keys, "style" key, "i" key, and "flag" key. However, there is no key having the same value for all conditions b. Accordingly, condition b becomes empty because there is no common portion.

Assume that a common portion is extracted from Example 7 and Example 8 in 1-3. Since the value of "Cart" key common to Example 5 and Example 6 is an array, the elements of the array are regarded as conditions b. Then, keys common to all conditions b are "items" key and "total" key. Recursive depth-first comparison of the values finally shows that only the values of "price" key and "total" key are the same. Accordingly, "Cart": {"items": [{"CartItem": {"price": "100"}}],"total": "0"} is extracted as a common portion, with the hierarchical structure maintained.

Condition c, that is, cookie information, is generalized by converting all cookie information that belongs to the metadata M1 and the metadata MBl (l=1, 2, . . . , M) to a key-value pair structure, such as JSON, and by extracting a common portion. Note that cookie information formed of single information, such as secure, is converted to a key-value pair structure in which keys and values are the same. A description of a method for extracting a common portion from all cookie information after conversion will be omitted here because it is the same as that described for condition b.

Condition e, that is, block identification information that locates the block B1 in condition d, is generalized by leaving only a common path from the head and a common path from the rearmost end. An intermediate unmatched portion other than those is omitted and is directly joined with a descendant using "//". However, if the indices do no match, only the indices are omitted. If there is no common path from the head, the sum of sets (UNION) is used to narrow down the target.

(Example 1) Only indices do not match

Input 1: /html/body/div/div/table/tr[3]

Input 2: /html/body/div/div/table/tr[7]

Input 3: /html/body/div/div/table/tr[1]

Since only the last indices differ, the result of generalization is "/html/body/div/div/table/tr".

(Example 2) Intermediate paths differ

Input 1: /html/body/div/div/table/tr[1]/div/div/form/input[1]

Input 2: /html/body/div/table/tr[1]/div/form/input[1]

Input 3: /html/body/div/div/table/tr[3]/form/input[1]

Since a portion from the head to "/html/body/div" matches the others, and a portion from the rearmost portion to "form/ input[1]" is the same as the others, the result of generalization is obtained by combining the two portion with "//", "/html/body/div//form/input[1]".

Figure 4:
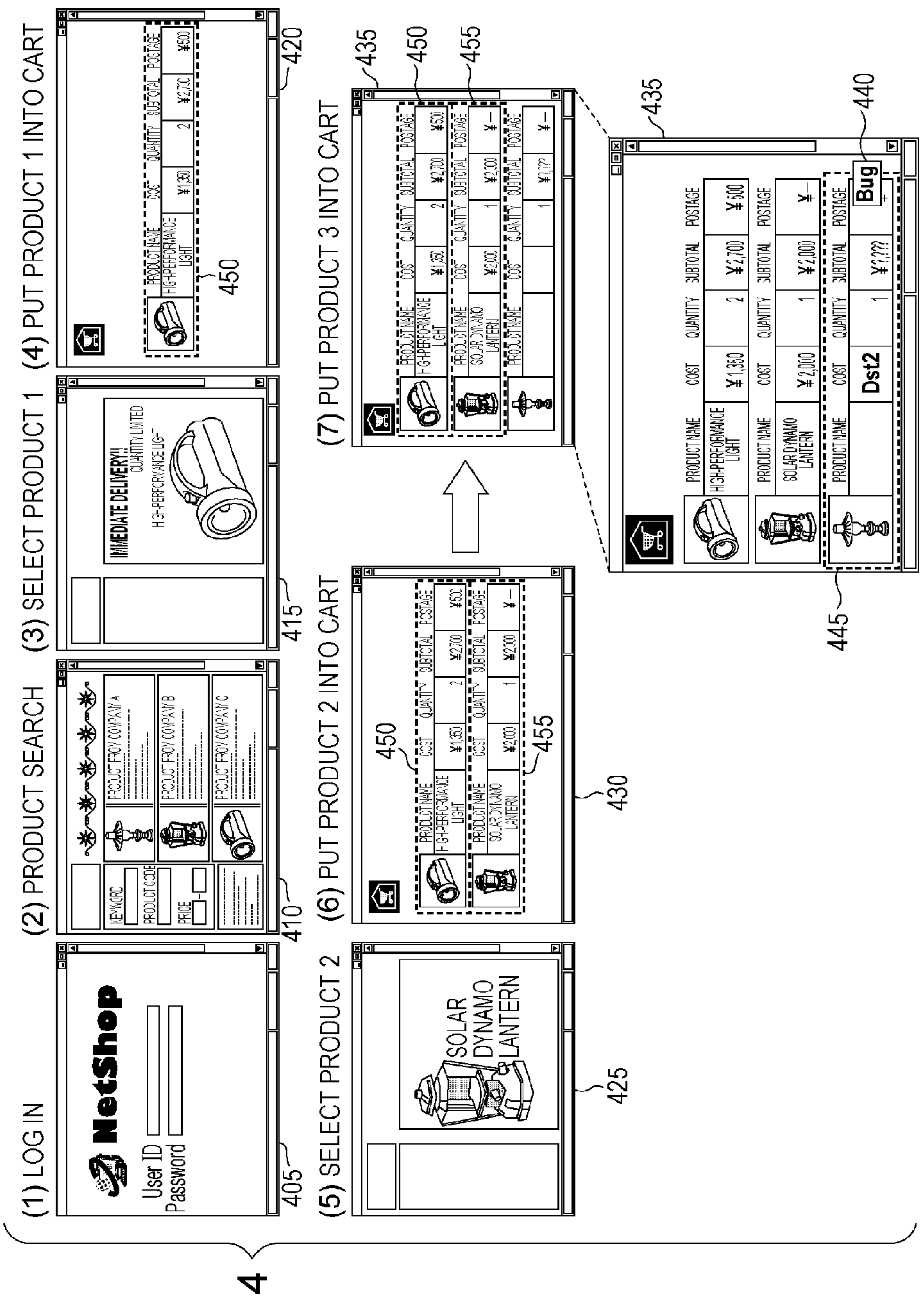
FIG. 4 is a diagram showing an example of the scenario of a first embodiment.

The support apparatus 200 has been described in accordance with the scenario of the first embodiment. FIG. 4 shows an example of the scenario of the first embodiment. To correct the problem P1 of a cart function of a certain shopping site on the Web, the corrector starts a web browser that operates in cooperation with the support apparatus 200 to (1) log in the shopping site, (2) searches products, (3) selects a product 1, (4) puts it into a shopping cart, and repeats the same process for products 2 and 3, (10) finally puts the product 3 into the shopping cart, and identifies a location 440 at which the problem P1 (bug) has occurred. When the corrector manually corrects the problem P1 (bug), the support apparatus 200 that is started in cooperation with the web browser creates the metadata M1 including the details of correction in accordance with the structure of metadata that the present invention newly defines, described above. Then, the support apparatus 200 detects blocks 450 and 455, as locations to which the created metadata M1 is applicable, from the operation log L1 (information on display screens 405 to 435 in FIG. 4) until the location of the problem P1 is identified, using a semantic block 445 including the location 440 of the problem P1 (bug) as a clue. The support apparatus 200 creates metadata MB1 and MB2 for the blocks 450 and 455 and generalizes the metadata M1 using the metadata MB1 and MB2 so as to be applied to the blocks 450 and 455.

Figure 5:
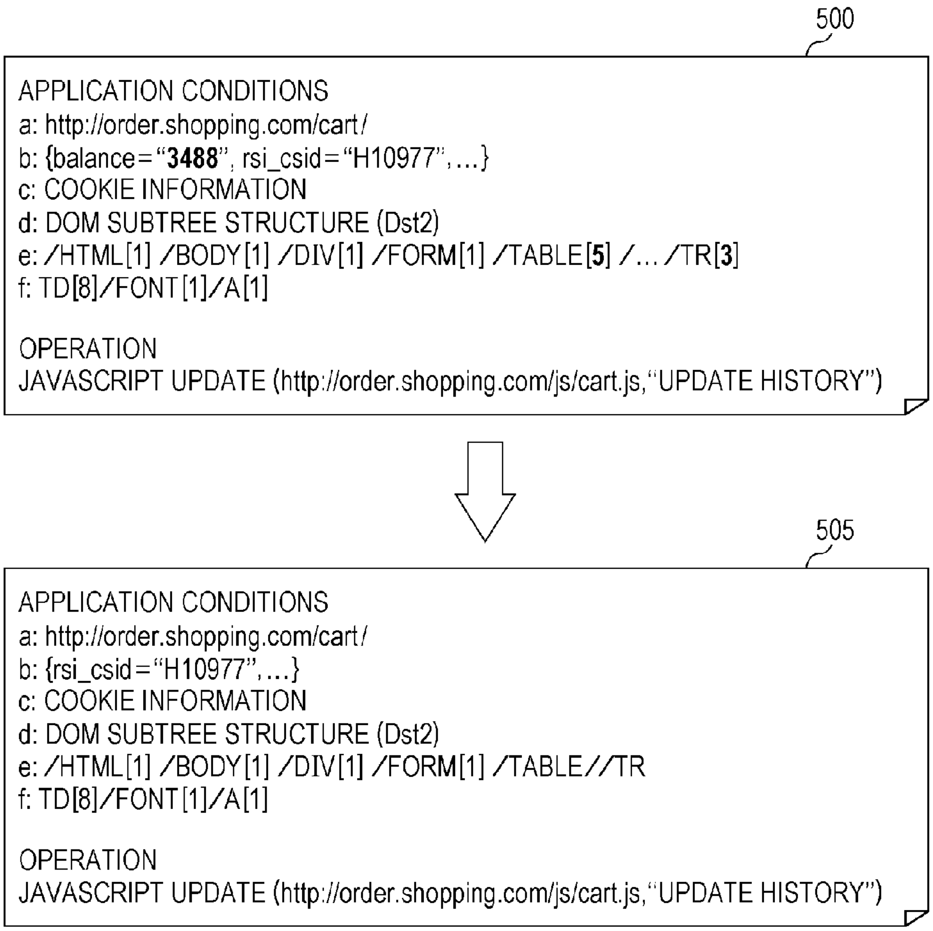
FIG. 5 is a diagram showing an example of metadata before and after the metadata is generalized in the first embodiment of the present invention.

FIG. 5 shows the states of the metadata M1 for correcting the location 440 of the problem P1 (bug) before and after the metadata M1 is generalized. Metadata M1 500 is the metadata M1 before being generalized, and metadata M1 505 is the metadata M1 after being generalized so as to be applicable to the blocks 450 and 455 shown in FIG. 4. FIG. 5 shows generalization of a global variable group related to a Web page (a screen 435 in FIG. 4) in which a problem has occurred and block identification information that locates a block (the block 445 in FIG. 4) in the web page (the screen 435 in FIG. 4) in accordance with the individual generalization algorithms for C condition b and condition e. "Dst2" included in condition d of metadata M1 500 and 505 shown in FIG. 5 is an identifier of the block.

Figure 6:
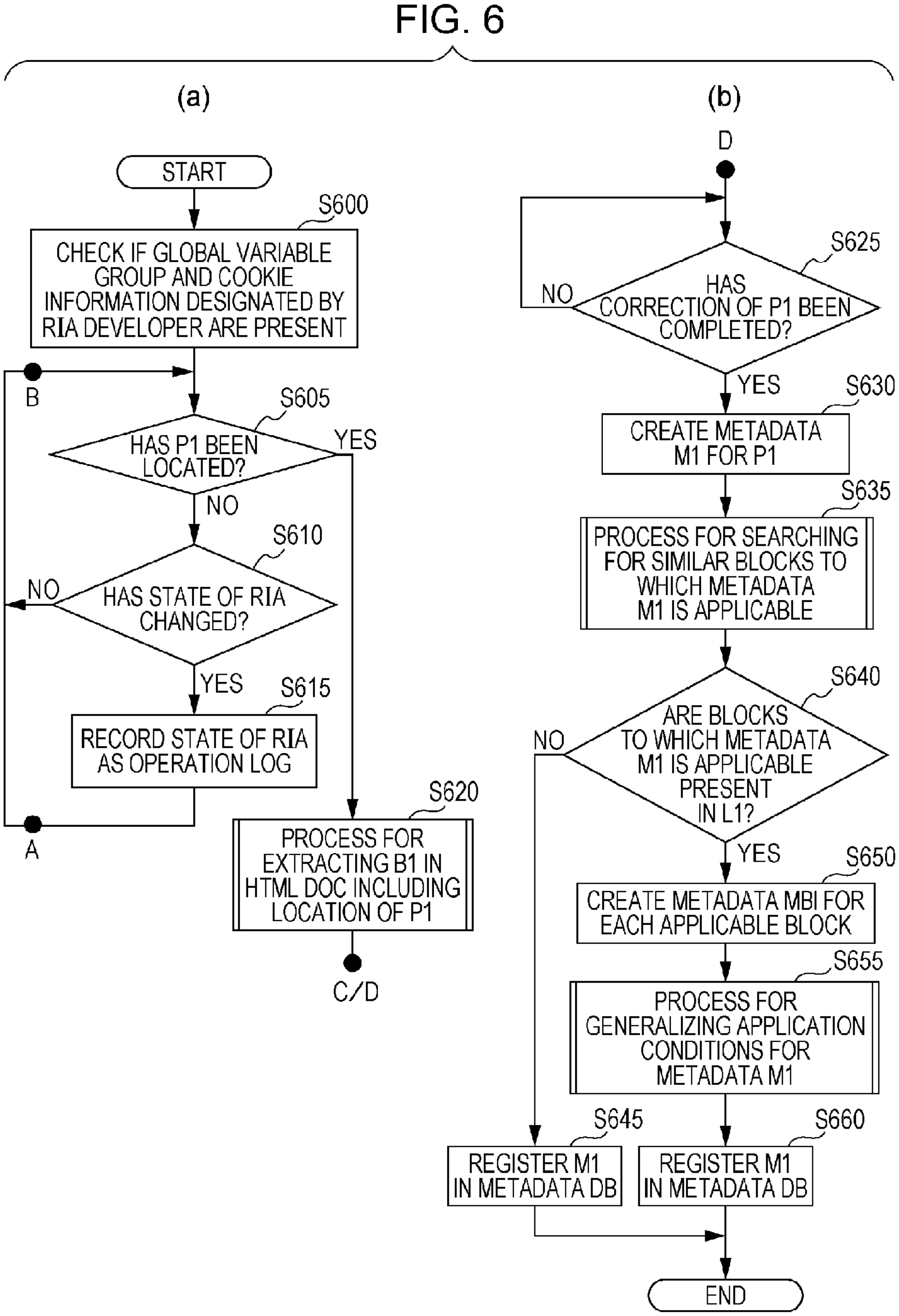
FIG. 6(*a*) is a flowchart of the first half of a process for creating and managing metadata according to the first embodiment of the present invention.
Figure 7:
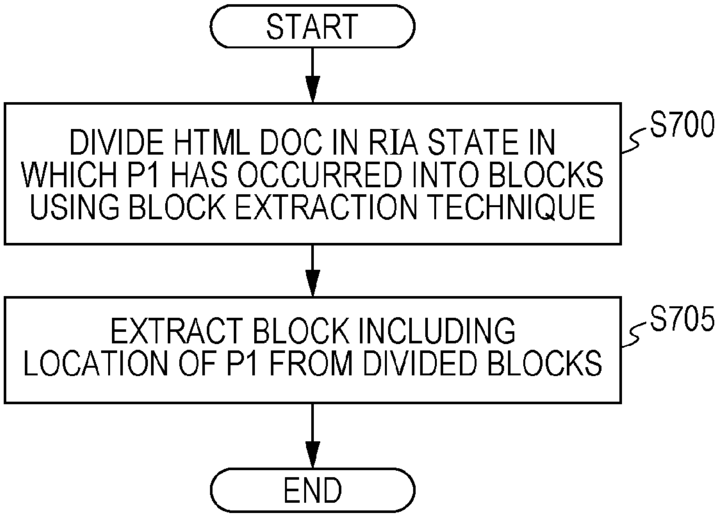
FIG. 7 is a flowchart of a block extraction process in the first embodiment of the present invention.
Figure 8:
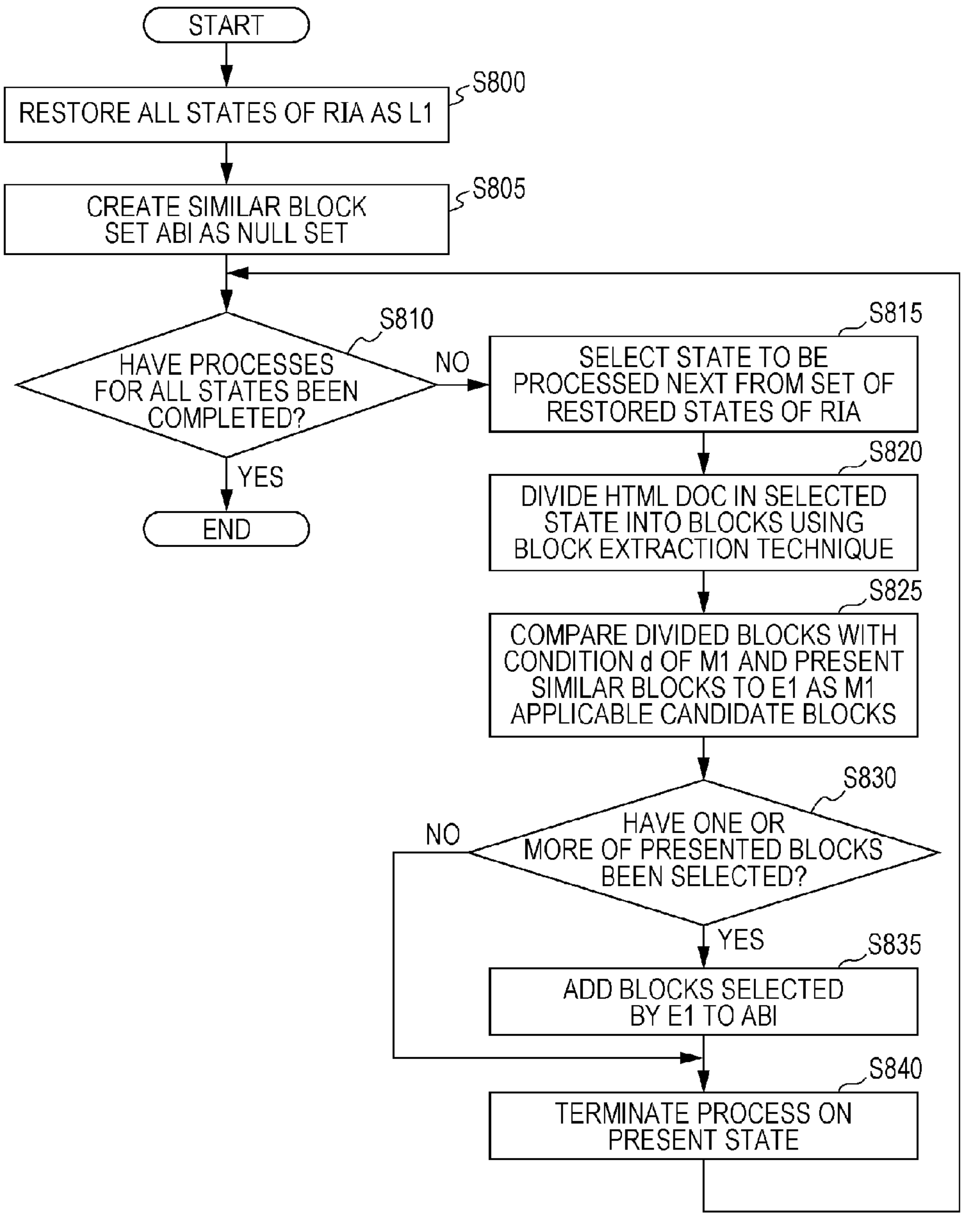
FIG. 8 is a flowchart of a similar-block search process in the first embodiment of the present invention.
Figure 9:
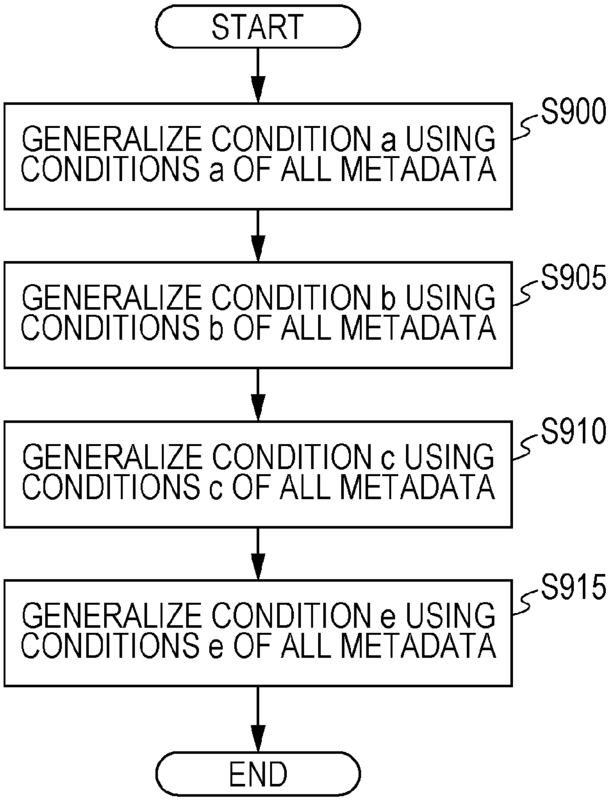
FIG. 9 is a flowchart of a generalization process in the first embodiment of the present invention.

Next, referring to FIGS. 6 to 9, the flow of metadata creation and generalization processes according to the first embodiment of the present invention will be described. FIG. 6(*a*) is a flowchart of the first half of a process for creating and managing metadata according to the first embodiment of the present invention. FIG. 6(*b*) is a flowchart of the latter half of the process for creating and managing metadata according to the first embodiment of the present invention. FIG. 7 is a flowchart of a block extraction process in step 620 of FIG. 6(*a*). FIG. 8 is a flowchart of a similar-block search process in step 635 of FIG. 6(*b*). FIG. 9 is a flowchart of a generalization process in step 655 of FIG. 6(*b*).

The flowchart showing the flow of the metadata creation and management process shown in FIG. 6(*a*) starts from step 600, in which the support apparatus 200 accesses the generalization target DB 210 and determines whether information that identifies a global variable group and the kind of cookie information related to the RIA 250 that the web browser accesses at present has been registered in the support apparatus 200 by the developer, wherein if it has been registered, the support apparatus 200 reads the information into a work area. Next, the support apparatus 200 determines whether the problem P1 has been located by the corrector E1 (step 605).

If the problem P1 has not been located (step 605: NO), the process proceeds to step 610, in which the support apparatus 200 determines whether the state of the RIA 250 has changed. If it is determined that the state of the RIA 250 has not changed (step 610: NO), the process returns to step 605. In contrast, if it is determined that the state of the RIA 250 has changed (step 610: YES), the support apparatus 200 acquires the state of the RIA 250 and stores it in the operation log DB 220 as the operation log L1. Then, the process returns to the determination process in step 605.

In step 605, if it is determined that the problem P1 has been located (step 605: YES), the process proceeds to step 620, in which the support apparatus 200 extracts the block B1 including the location of the problem P1 in the HTML DOM. The details of the process of extracting the block B1 will be described later with reference to FIG. 7. After step 620, the process proceeds to step 625 in the flowchart shown in FIG. 6(*b*) via a connection point D. The flow of the process passing through a connecting point C after step 620 will be described later as a second embodiment.

Next, in step 625 of FIG. 6(*b*), the support apparatus 200 determines whether the problem P1 has been corrected by the corrector E1. The determination in step 625 is repeated until correction of the problem P1 is completed. If it is determined that the correction of the problem P1 by the corrector E1 has been completed (step 625: YES), the process proceeds to step 630, in which the support apparatus 200 creates the metadata M1 for correcting the problem P1 in accordance with the structure of metadata that is newly defined in the present invention. Then, the support apparatus 200 searches the operation log DB 210 for similar blocks to which the created metadata M1 is applicable (step 635). The details of the similar-block search process will be described later with reference to FIG. 8.

Then, the support apparatus 200 determines whether similar blocks to which the created metadata M1 is applicable have been found (step 640). If no similar block is found (step 640: NO), the support apparatus 200 registers the created metadata M1 in the metadata DB 240 (step 645), and the process ends. If similar blocks are found (step 640: YES), the process proceeds to step 650, in which the support apparatus 200 creates metadata MBl corresponding to the detected similar blocks. Then, the support apparatus 200 generalizes the application conditions of the metadata M1 using all the metadata MBl created in step 650 (step 655). The details of the process of generalizing the application conditions of the metadata M1 will be described later with reference to FIG. 9. Next, the support apparatus 200 registers the generalized metadata M1 in the metadata DB 240 (step 660). Then, the process ends.

A flowchart of the block extraction process shown in FIG. 7 starts from step 700, in which the support apparatus 200 divides an HTML document in the state of the RIA 250 in which the problem P1 has occurred into a plurality of blocks using an existing block extraction technique, such as the block extraction method proposed by J. Mahmud et al. Then, the support apparatus 200 extracts a block including the location of the problem P1 from the plurality of divided blocks (step 705). Then, the process ends.

A flowchart of the similar-block search process shown in FIG. 8 starts from step 800, in which the support apparatus 200 reads the operation log L1 recorded until the present problem P1 is located from the operation log DB 220 and restores the individual states ASi (i=1, 2, . . . , n) of the RIA 250, which have changed during operation, from the operation log information 1 included in the operation log L1. Next, the support apparatus 200 creates a set ABl of similar blocks to which the metadata M1 is applicable as a null set (step 805). Then, the support apparatus 200 determines whether a series of processes in the following steps 815 to 840 have been completed for all the states ASi (i=1, 2, . . . , n) of the RIA 250 (step 810).

If a state ASi in which the above processes have not been completed remains (step 810: NO), then, the support apparatus 200 selects a state ASi to be processed next from the set of the restored states ASi (i=1, 2, . . . , n) of the RIA 250 (step 815) and divides the HTML document in the selected state ASi into a plurality of blocks using an existing block extraction technique, such as the block extraction technique proposed by J. Mahmud et al. (step 820). Then, the support apparatus 200 compares the divided blocks and the block B1 serving as the condition d of the created metadata M1 using the foregoing existing similarity determination technique and presents all the similar blocks as a set of metadata M1 application candidates to the corrector E1 (step 825).

Next, the support apparatus 200 determines whether one or more similar blocks have been selected by corrector E1 from the set of metadata M1 application candidates presented (step 830). If one or more similar blocks have been selected by the corrector E1 (step 830: YES), the support apparatus 200 adds the one or more selected similar blocks to the set ABl of similar blocks to which the metadata M1 is applicable (step 835). If no similar block has been selected by the corrector E1 (step 830: NO) or from step 835, the process proceeds to step 840, in which the support apparatus 200 terminates the foregoing processes on the present state ASi of the RIA 250 and returns to step 810. Then, the support apparatus 200 determines in step 810 whether the processes on all the states ASi of the RIA 250 have been completed, and if the support apparatus 200 determines that the processes on all the state ASi have been completed (step 810: YES), the similar-block search process ends.

A flowchart of the generalization process shown in FIG. 9 starts from step 900, in which the support apparatus 200 generalizes condition a of the metadata M1, that is, an URL that locates a Web page in which a problem has occurred. The generalization is performed using condition a of the metadata M1 and conditions a of all metadata MBl created for individual similar blocks to which the metadata M1 is applicable in accordance with the foregoing algorithm for generalizing condition a. Then, the support apparatus 200 generalizes condition b of the metadata M1, that is, the global variable group (step 905). The generalization is performed using condition b of the metadata M1 and conditions b of all the metadata MBl created for the individual similar blocks to which the created metadata M1 is applicable in accordance with the foregoing algorithm for generalizing condition b.

Next, the support apparatus 200 generalizes condition c of the metadata M1, that is, cookie information (step 910). The generalization is performed using condition c of the metadata M1 and conditions c of all the metadata MBl created for the individual similar blocks to which the metadata M1 is applicable in accordance with the foregoing algorithm for generalizing condition c. Then, the support apparatus 200 generalizes condition e of the metadata M1, that is, block identification information that locates the block B1 (step 915). The generalization is performed using condition e of the metadata M1 and conditions e of all the metadata MBl created for the individual similar blocks to which the metadata M1 is applicable in accordance with the foregoing algorithm for generalizing condition e.

Second Embodiment

The second embodiment is consistent with a scenario in which the metadata M1 for a corrector to correct the problem P1 on the RIA 250 by using the support apparatus 200 is created using existing metadata M0, and the existing metadata M0 used is generalized using the created metadata M1. The support apparatus 200 according to the second embodiment also includes the generalization-target setting section 205, the generalization target DB 210, the operation-log recording section 215, the operation log DB 220, the metadata creation section 225, the block extraction section 230, and the metadata generalizing section 245 like the support apparatus 200 according to the first embodiment. Since the common components have been described in the first embodiment, the function of the support apparatus 200 according to the second embodiment will be described hereinbelow with a focus on the similar-metadata search section 280 and a metadata DB 240, which are components peculiar to the support apparatus 200 according to the second embodiment.

Upon detecting that the state of the RIA 250 in which the problem P1 has occurred is identified by the corrected, the metadata creation section 225 call the similar-metadata search section 280 and searches the metadata DB 240 for existing metadata that is applicable to the problem P1. In this embodiment, the metadata DB 240 stores metadata created in the past in accordance with the structure of metadata that is newly defined in the present invention. Note that the work area of the support apparatus 200 stores the block B1 including the location of the problem P1 extracted by the block extraction section 230 and that the operation log DB 220 stores location information that locates the problem P1, as the information 2 in the operation log L1 stored by the operation-log recording section 215, at the point when the similar-metadata search section 280 is called.

When the similar-metadata search section 280 is called by the metadata creation section 225, the similar-metadata search section 280 searches for location information that locates the problem P1 in the block B1 serving as condition f of the metadata M1 from the block B1 including the location of the problem P1 and location information that locates the problem P1. Then, the similar-metadata search section 280 extracts all matched existing metadata Mi (i=1, 2, . . . , n, n: the number of matched metadata) from the metadata DB 240 using the block B1 serving as condition d of the metadata M1 and the location information serving as condition f of the metadata M1 as search keys. Then, the similar-metadata search section 280 presents all the extracted metadata Mi to the corrector to prompt the corrector to select one metadata Ms ($1 \leq s \leq n$) that is applicable to the problem P1. The selected metadata Ms is passed from the similar-metadata search section 280 to the metadata creation section 225.

The metadata creation section 225 creates the metadata M1 for correcting the problem P1 by using the operation information on the metadata Ms ($1 \leq s \leq n$) received from the similar-metadata search section 280. Since methods for calculating the remaining conditions a, b, c, and e of metadata are the same as those described in the first embodiment, descriptions thereof will be omitted here.

Furthermore, the metadata creation section 225 calls the metadata generalizing section 245 and generalizes the metadata Ms ($1 \leq s \leq n$) that is applicable to the problem P1 to metadata MF in which the application conditions are wider by using the created metadata M1. The metadata creation section 225 updates the existing metadata Ms ($1 \leq s \leq n$) stored in the metadata DB 240 by using the metadata MF.

When the metadata generalizing section 245 is called by the metadata creation section 225, the metadata generalizing section 245 generalizes application conditions (conditions a, b, c, and e) of the metadata Ms by using the metadata Ms ($1 \leq s \leq n$) and the newly created metadata M1. Since algorithms for generalizing the conditions are the same as those described in the first embodiment, descriptions thereof will be omitted here.

Figure 10:
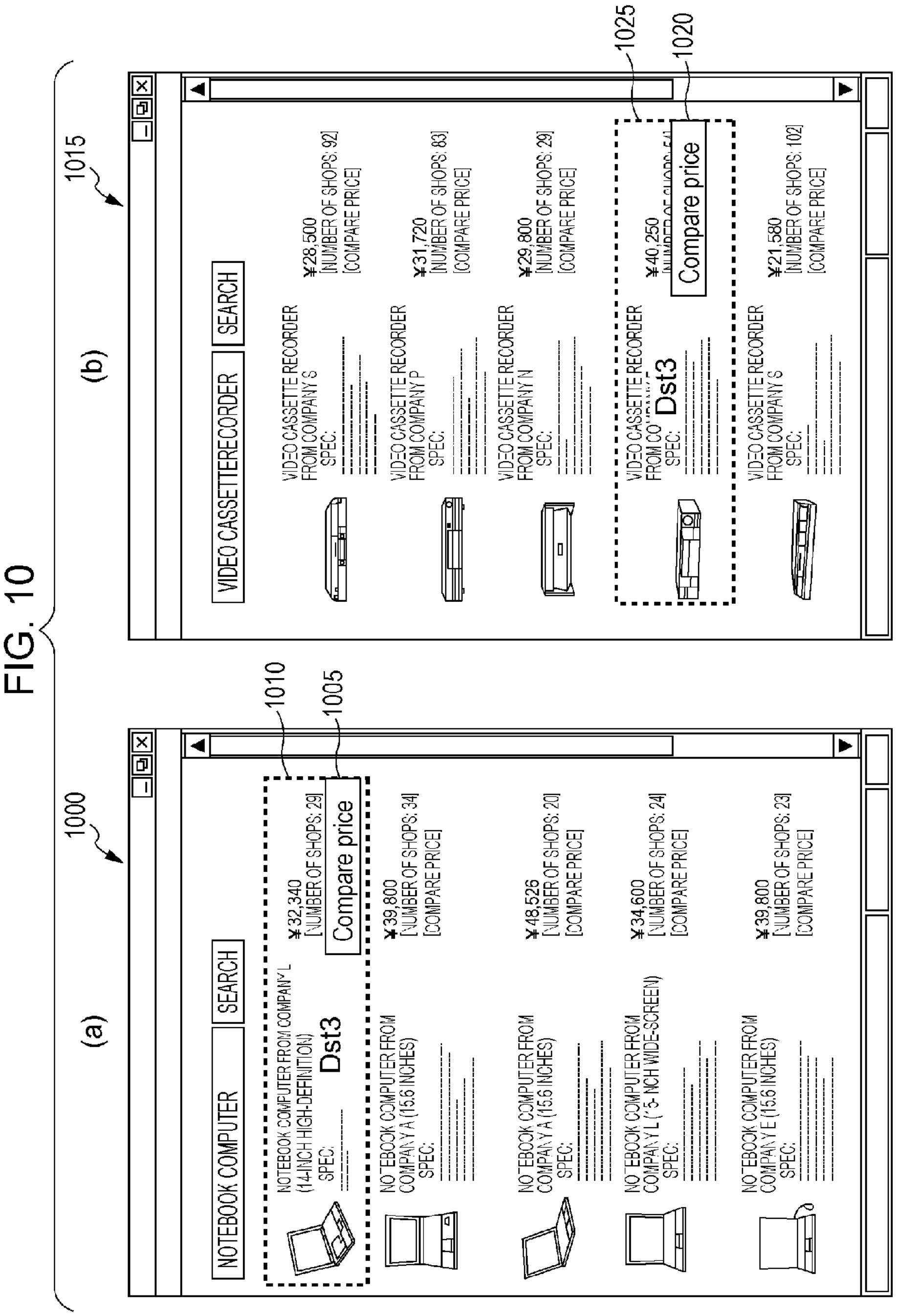
FIG. 10 is a diagram showing an example of the scenario of a second embodiment of the present invention.

The support apparatus 200 has been described above in accordance with the scenario of the second embodiment. FIG. 10 shows an example of the scenario of the second embodiment. To correct a problem in Compare Price in the product search results in a certain shopping site on the Web, a corrector starts a web browser that operates in cooperation with the support apparatus 200 and accesses the shopping site, requests a search result by using "notebook computer" as a search key to obtain a Web page 1000 shown in FIG. 10(*a*). When the corrector locates the problem P1 (Compare Price) 1005, the support apparatus 200 extracts a block 1010 including the location 1005 and searches the metadata DB 240 by using the block 1010 (condition d) and the location 1005 of the problem P1 (Compare Price) in the block 1010 (condition f) as search keys.

The metadata DB 240 stores metadata M0 for correcting the location 1020 of a problem P0 (Compare Price) on a Web page 1015 shown in FIG. 10(*b*). Since the Web page 1015 is a search result obtained by using "video cassette recorder" as a search key in the same shopping site, the same problem for Compare Price has occurred, the metadata M0 has been created to correct it. The support apparatus 200 extracts the metadata M0 from the metadata DB 240 as metadata having the same conditions as the search keys, condition d and condition f, and creates the metadata M1 to be applied to the present problem P1 using the metadata M0. Furthermore, the support apparatus 200 generalizes the application conditions of the existing metadata M0 by using the metadata M1.

Figure 11:
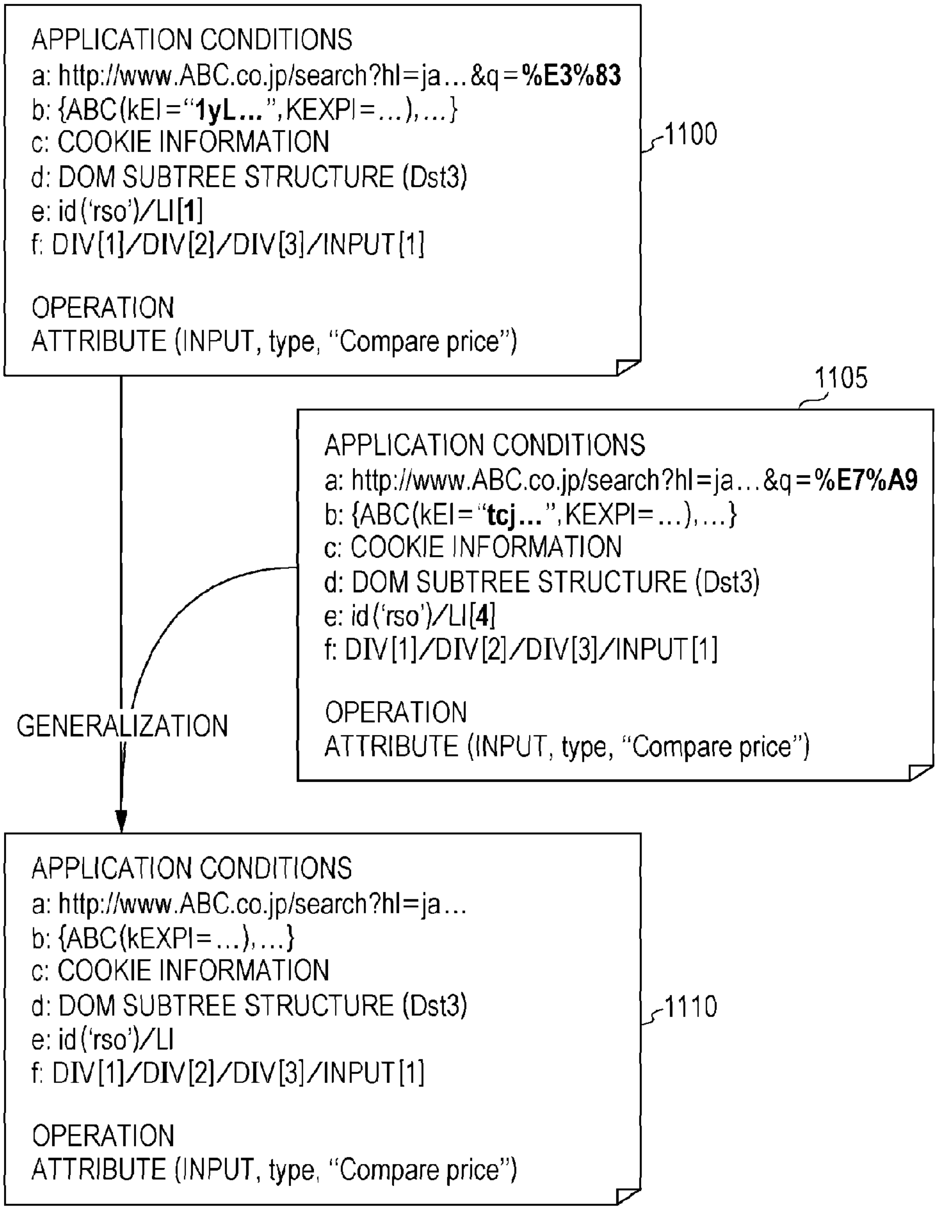
FIG. 11 is a diagram showing an example of metadata before and after the metadata is generalized in the second embodiment of the present invention.

FIG. 11 shows the states of the existing metadata M0 for correcting the location 1020 of the problem P0 (Compare Price) shown in FIG. 10(*b*) before and after being generalized. Metadata M1 1100 is metadata M1 that is newly created to correct the location 1005 of the problem P1 (Compare Price) shown in FIG. 10(*a*). Metadata M0 1105 is the existing metadata M0 before being generalized, and metadata M0 1110 is the existing metadata M0 after being generalized using the newly created metadata M1. In the generalization shown in FIG. 11, the URL and the global variable group of the Web page 1015 in which the problem has occurred and the block identification information that locates the block 1025 are generalized in accordance with algorithms for generalizing conditions a, b, and e.

Figure 12:
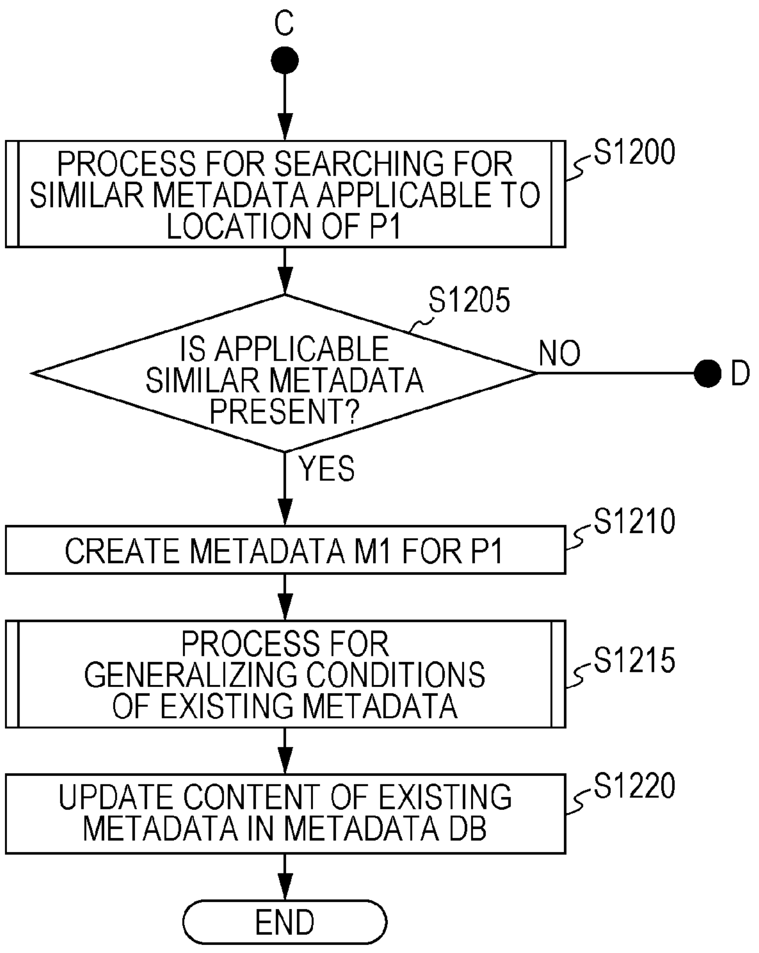
FIG. 12 is a flowchart of the later half of the process of creating metadata and generalizing existing metadata according to the second embodiment of the present invention.
Figure 13:
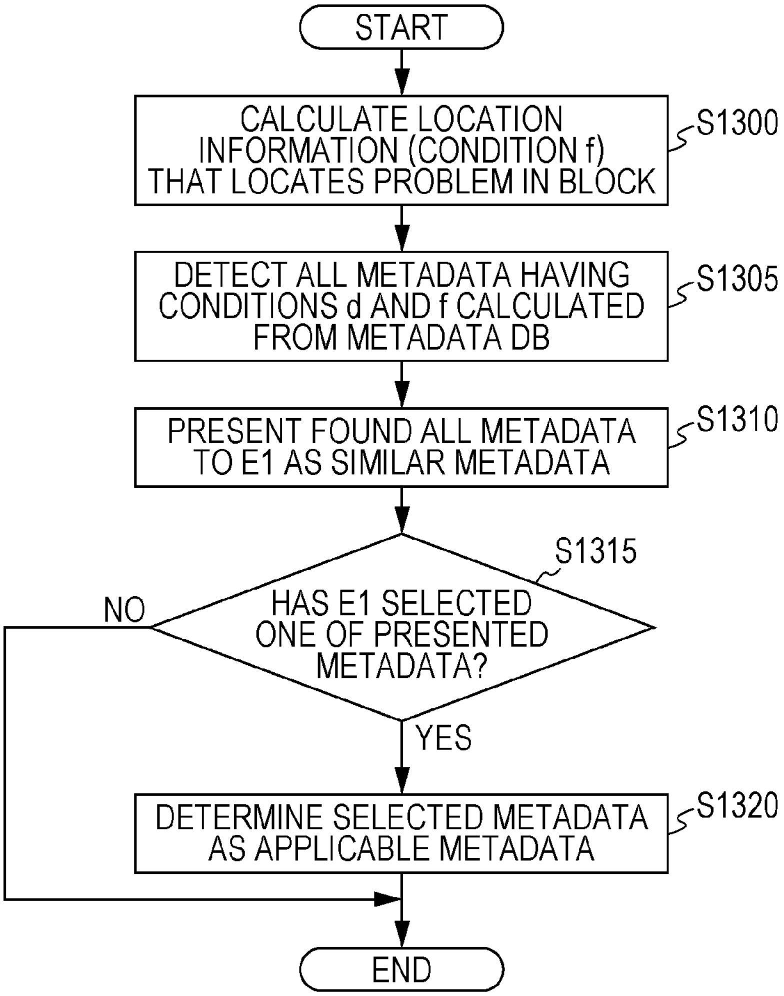
FIG. 13 is a flowchart of a similar-metadata search process in the second embodiment of the present invention.

Next, the flow of the metadata creation and generalization processes according to the second embodiment of the present invention will be described with reference to FIGS. 12 to 13. FIG. 12 is a flowchart of the later half of the process of creating metadata and generalizing existing metadata according to the second embodiment of the present invention. Since the first half of the metadata creation process according to the second embodiment is the same as the process until the block extraction process in the metadata creation process according to the first embodiment, a description thereof will be omitted here. FIG. 13 is a flowchart of a similar-metadata search process in the second embodiment of the present invention.

The flowchart of the process of generalizing metadata and generalizing existing metadata shown in FIG. 12 shows the flow of a process following the block extraction process in step 620 in FIG. 6(*a*). In step 1200, the support apparatus 200 searches the metadata DB 240 for the existing metadata M0 that is applicable to the location of the present problem P1. The details of the similar-metadata search process will be described later with reference to FIG. 13. Next, the support apparatus 200 determines whether the existing metadata M0 that is applicable to the location of the present problem P1 is present (step 1205). If the existing metadata M0 is not present (step 1205: NO), the process proceeds to step 625 in the flowchart shown in FIG. 6(*b*) through the connecting point D, which has been described in the first embodiment. In this case, the corrector manually corrects the problem P1. For the processes from then on, refer to the first embodiment.

In contrast, if the existing metadata M0 that is applicable to the location of the present problem P1 is present (step 1205: YES), the process proceeds to step 1210, in which the support apparatus 200 creates the metadata M1 for correcting the location of the present problem P1 by using the operation information on the existing metadata M0 in accordance with the metadata structure that is newly defined in the present invention. Next, the support apparatus 200 generalizes the application conditions of the existing metadata M0 by using the newly created metadata M1 (step 1215). Since the details of the generalization process is the same as those described with reference to FIG. 9, a description thereof will be omitted here. Finally, the support apparatus 200 updates the application conditions on the existing metadata M0, stored in the metadata DB 240, found in the similar-metadata search process in step 1200 with the application conditions obtained in the generalization process of step 1215 (step 1220). Then, the process ends.

The flowchart of the similar-metadata search process shown in FIG. 13 starts from step 1300, in which the support apparatus 200 calculates location information (condition f of the metadata M1) that locates the problem P1 in the block B1 (condition d of the metadata M1) including the location of the problem P1. The calculation is performed by extracting information from the head of the block B1 to the location of the problem P1 from location information that locates the problem P1 in the information 2 in the operation log. Then, the support apparatus 200 extracts all matched existing metadata Mi ($i=1, 2, \ldots n$, n: the number of matched metadata) from the metadata DB 240 by using the block B1 serving as condition d of the metadata M1 and the location information serving as condition f of the metadata M1 as search keys (step 1305).

Then, the support apparatus 200 presents all the extracted metadata Mi to the corrector E1 to prompt the corrector E1 to select one item of metadata applicable to the problem P1 (step 1310). Next, the support apparatus 200 determines whether the corrector E1 has selected one of the presented metadata Mi (step 1315). If the metadata Mi is not elected (step 1315: NO), the process ends. In contrast, if the corrector E1 has corrected the presented metadata Mi (step 1315: YES), the support apparatus 200 determines that selected metadata Mi is metadata Ms ($1 \le s \le n$) applicable to the problem P1 (step 1320). Then, the process ends.

Third Embodiment

A third embodiment is consistent with a scenario in which existing metadata that is applicable to the present state of the RIA 250 is searched for from the metadata DB 240 in response to a change in the state of the RIA 250, and if the metadata application location in the present state of the RIA 250, which is determined on the basis of the application conditions of the found existing metadata, is not the same as an intended application position, the corrector is prompted to finely adjust the existing-metadata application conditions, and the existing metadata is generalized on the basis of the finely adjusted information. The support apparatus 200 according to the third embodiment is achieved by adding a metadata verification section 275 to the components of the support apparatus 200 according to the first or second embodiment. Thus, the function of the support apparatus 200 according to the third embodiment will be described with a focus on the metadata verification section 275.

When the metadata creation section 225 has detected that the state of the RIA 250 has changed, the metadata creation section 225 calls the metadata verification section 275 and verifies whether the existing metadata stored in the metadata DB 240 can be properly applied to the present state of the RIA 250. Here, note that the operation log DB 220 stores the present state ASp of the RIA 250 as a combination of the URL of the information A, the global variable group of the information B, the cookie information of the information C, and the HTML DOM of the information D, as described above.

When the metadata verification section 275 is called by the metadata creation section 225, the metadata verification section 275 extracts existing metadata Mi (i=1, 2, . . . n, n: the number of applicable metadata) whose application conditions a, b, and c are the same, from the metadata DB 240, as existing metadata applicable to the present state ASp of the RIA 250, by using the URL of the information A, the global variable group of the information B, and the cookie information of the information C, which identify the present state ASp of the RIA 250, as search keys. Then, the metadata verification section 275 extracts a block Bi present at a position that condition e of the metadata Mi identifies from the HTML DOM of the information D that identifies the present state ASp of the RIA 250, for the individual extracted metadata Mi, and compares the extracted block Bi with the block of condition d of the metadata Mi.

If the blocks match, it means that the extracted existing metadata Mi can be properly applied to the present state ASp of the RIA 250, and thus, the metadata verification section 275 terminates the metadata verification process. However, if the blocks do not match, it means that there is a high possibility that the application location of the existing metadata Mi has moved to another position in the Web page in units of blocks including the application location or has been deleted. Therefore, the metadata verification section 275 presents a set Mj (j=1, 2, . . . m, m: the number of metadata in which blocks do not match, m≤n) of metadata in which the blocks do not match to the corrector to prompt the corrector to correct the block identification information of condition e in the metadata Mj. The block information does not change even if the state of the RIA 250 changes, as described above. Therefore, by searching the HTML DOM of the RIA 250 in the present state ASp for a block that matches condition d of the existing metadata Mi, the application location of the existing metadata Mi moved or, if it is deleted, the fact thereof can be found.

When corrected block identification information is input from the corrector, the metadata verification section 275 generalizes condition e of metadata Mj in accordance with the algorithm for generalizing condition e, described in the first embodiment, by using block identification information before being corrected and the corrected block identification information. The metadata verification section 275 updates condition e of the metadata Mj in the metadata DB 240 with the generalized condition e.

Figure 14:
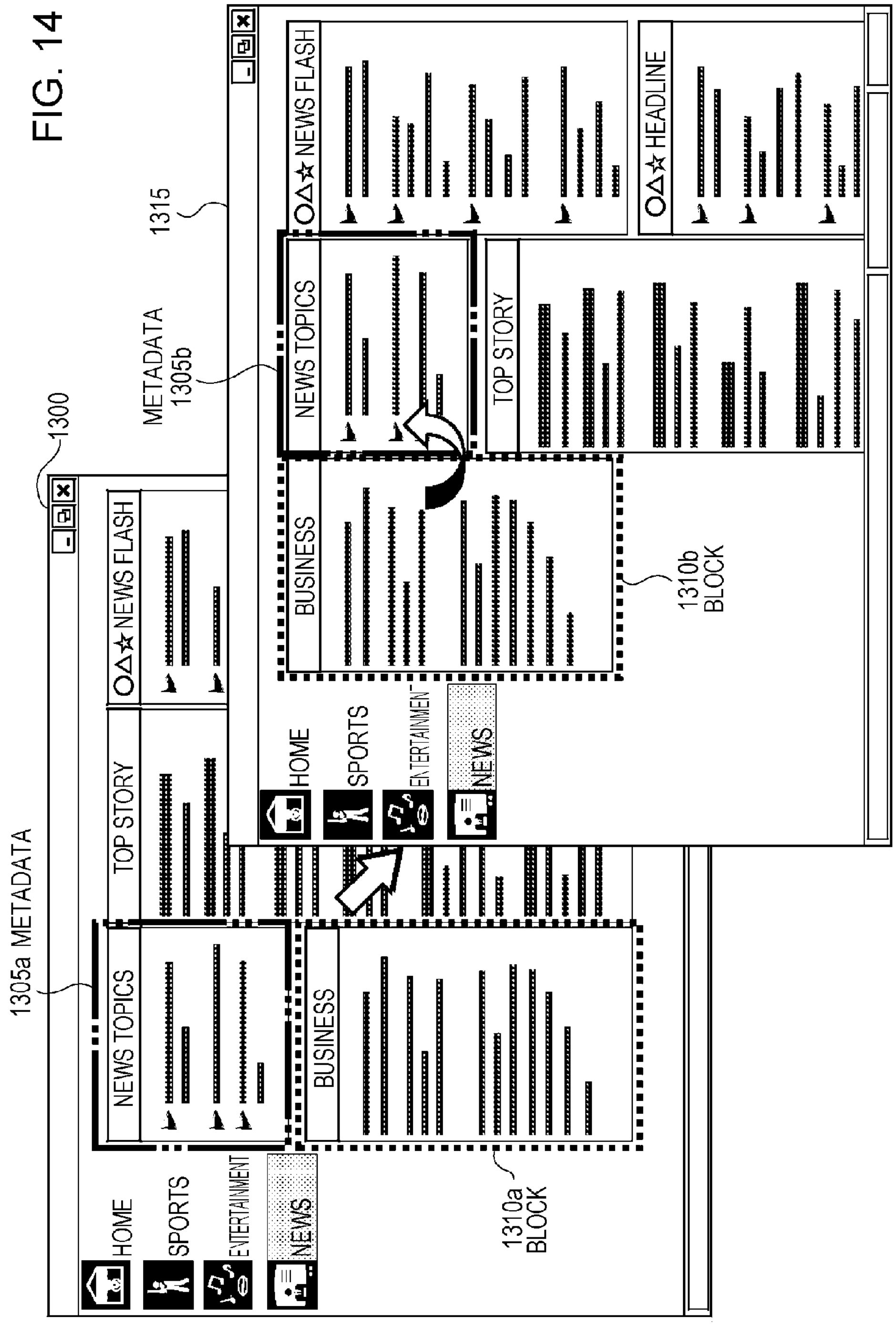
FIG. 14 is a diagram showing an example of the scenario of a third embodiment.

The support apparatus 200 has been described in accordance with the scenario of the third embodiment. FIG. 14 shows an example of the scenario of the third embodiment. Web pages 1300 and 1315 shown in FIG. 14 are top screens of the same portal site that can be customized to preference, which are Web pages in different states. That is, a block 1305 of a widget disposed at the left in the Web page 1300 is moved to a central column in the Web page 1315, that is, a block 1305*b* at a different position. Suppose the following situation: the corrector displays the Web page 1315 during a correcting operation, and the metadata DB 240 stores metadata M0 for correcting the problem in the block 1305*a* on the Web page 1300.

Then, the support apparatus 200 extracts the metadata M0 from the metadata DB 240 as metadata that is applicable to the present Web page 1315 because the URL, global variable group, and cookie information of the Web page 1315 that the web browser displays at present match conditions a, b, and c of the application conditions of the metadata M0. Then, the support apparatus 200 extracts a block 1310*b* that is present at a position that condition e of the metadata M0 identifies from the Web page 1315 and compares the block 1310*b* with a block 1305*a* on the Web page 1300, which is designated as condition d of the metadata M0. Since the blocks do not match, the support apparatus 200 surmises that the original block 1305*a* has moved or has been deleted and prompts the corrector to finely adjust condition e of the metadata M0 so that it can be properly applied to the present Web page 1315. When corrected condition e is input by the corrector, the support apparatus 200 generalizes condition e by using the original condition e and the corrected condition e and updates the condition e of the metadata M0 in the metadata DB 240 by using the generalized condition e.

Figure 15:
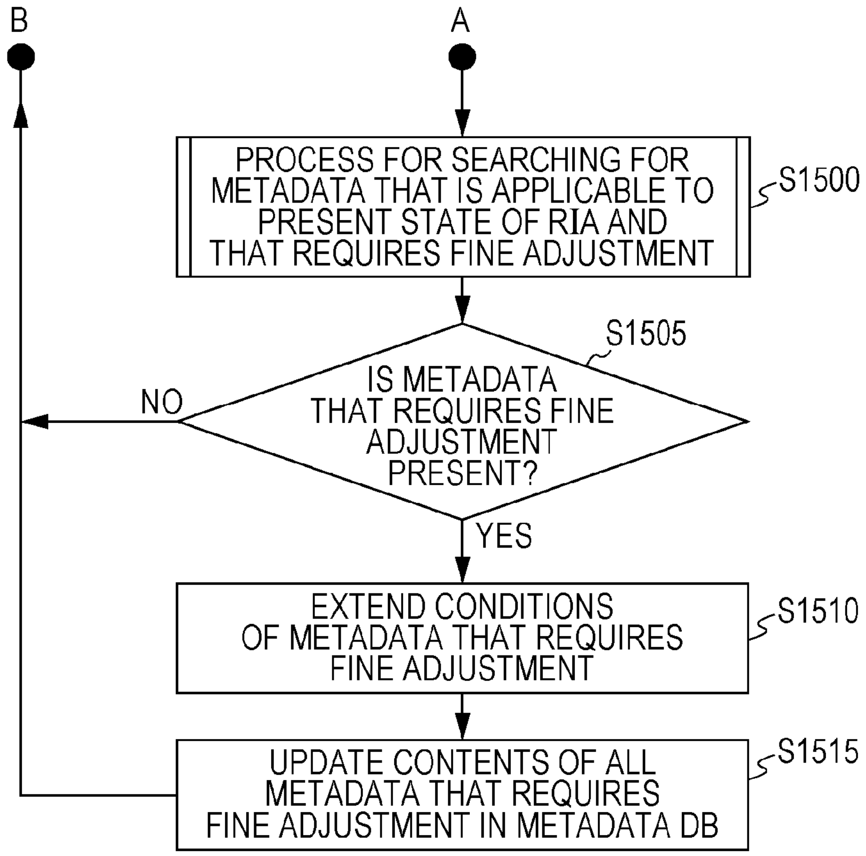
FIG. 15 is a flowchart of the process of finely adjusting existing metadata according to the third embodiment of the present invention.
Figure 16:
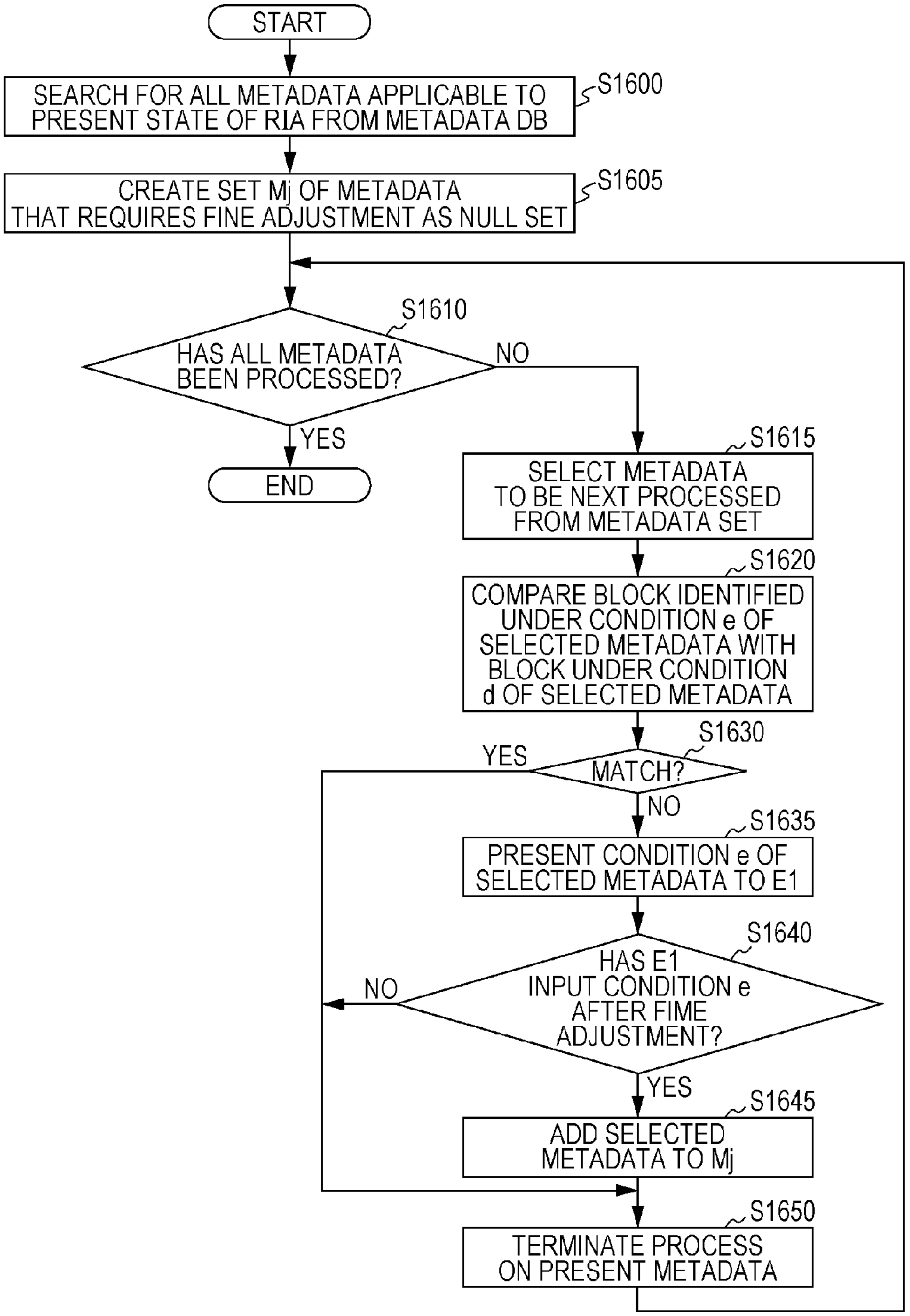
FIG. 16 is a flowchart of the process of searching for existing metadata that requires fine adjustment in the third embodiment of the present invention.

Next, the flow of the process of finely adjusting metadata according to the third embodiment of the present invention will be described with reference to FIGS. 15 to 16. FIG. 15 is a flowchart of the process of finely adjusting existing metadata according to the third embodiment of the present invention. FIG. 16 is a flowchart showing the detailed flow of the process of searching for existing metadata that requires fine adjustment in step 1500 of the flowchart shown in FIG. 15.

The process of finely adjusting metadata shown in the flowchart of FIG. 15 is executed in an intermediate point from step 615 back to step 605 in FIG. 6(*a*), in which, in step 1500, the support apparatus 200 searches the metadata DB 240 for metadata Mj (j=1, 2, . . . m, m: the number of metadata that is applicable and that requires fine adjustment) that is applicable to the present state of the RIA 250 and that requires fine adjustment. The details of the process of searching for the metadata Mj that requires fine adjustment will be described later with reference to FIG. 16. Next, the support apparatus 200 determines whether the metadata Mj that requires fine adjustment is present (step 1505).

If metadata Mj that requires fine adjustment is present (step 1505: YES), the support apparatus 200 generalizes block identification information of condition e for the individual metadata Mj that requires fine adjustment by using block identification information of corrected condition e input by the corrector E1 in accordance with the algorithm for generalizing condition e (step 1510). Then, the support apparatus 200 updates the metadata Mj in the metadata DB 240 with the block identification information of the generalized condition e (step 1515). After step 1515 or if the metadata Mj that requires fine adjustment is not present or in step 1505, the process returns to step 605 in FIG. 6(*a*) through a connecting point B.

The flowchart for the process of searching for metadata that requires fine adjustment shown in FIG. 16 starts from step 1600, in which the support apparatus 200 detects a set of metadata Mi (i=1, 2, . . . n, n: the number of applicable metadata) that is applicable to the present state ASp of the RIA 250 from the metadata DB 240 by using the information A, information B, and information C that identify the present state ASp of the RIA 250 as search keys. Then, the support apparatus 200 creates the set Mj of metadata that requires fine adjustment as a null set (step 1605).

Next, the support apparatus 200 determines whether a series of processes from step 1615 to step 1650 have been performed on all elements of the metadata set Mi. If step 1610 is executed for the first time, the determination result is "NO".

If metadata Mi in which the above processes have not been executed remains in the metadata set Mi (step 1610: NO), then the support apparatus 200 selects metadata Mi to be processed next from the metadata set Mi (step 1615). Next, the support apparatus 200 compares a block in the Web page in the present state ASp of the RIA 250 identified by condition e of the selected metadata Mi with a block of condition d of the selected metadata Mi (step 1620) and determines whether the blocks match (step 1630).

If the blocks do not match (step 1630: NO), the support apparatus 200 presents condition e of the selected metadata Mi to the corrector E1 (step 1635) to prompt the corrector E1 to correct condition e so that the metadata Mi becomes applicable to the present state of the RIA 250. Then, the support apparatus 200 determines whether the corrector E1 has input the corrected condition e (step 1640). If the finely adjusted condition e is input by the corrector E1 (step 1640: YES), the support apparatus 200 adds the selected metadata Mi to the metadata set Mj (step 1645). In contrast, if the blocks match in step 1630 (step 1630: YES), if the corrected condition e is not input by the corrector E1 in the step 1640 (step 1640: NO), or from step 1645, the process proceeds to step 1650, in which the support apparatus 200 terminates the process on the present metadata Mi and returns to step 1610. If it is determined in step 1610 that the above processes have been performed on all the metadata Mi (step 1610: YES), the process ends.

Figure 17:
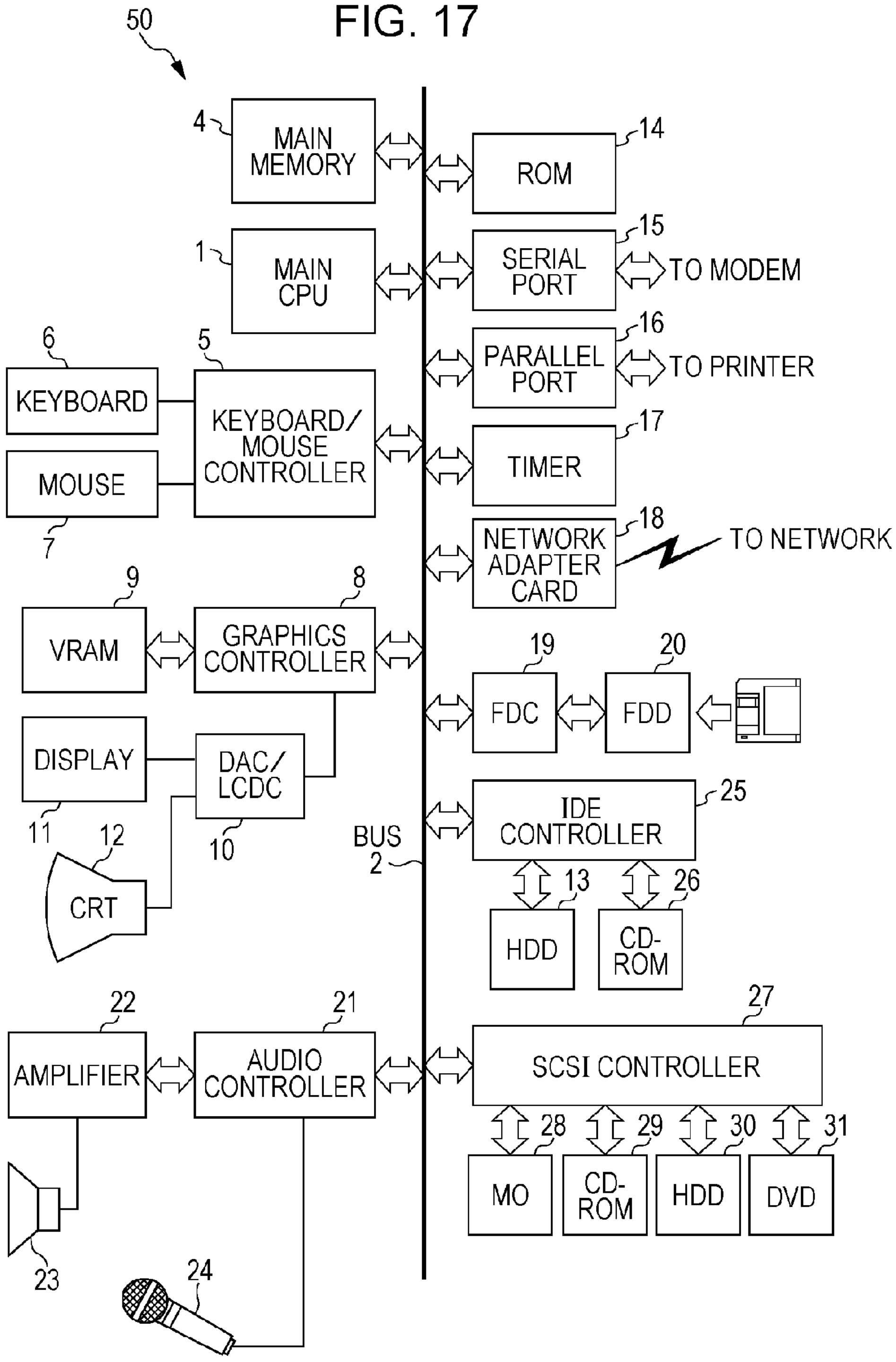
FIG. 17 is a diagram showing an example of the hardware configuration of an information processing unit suitable for implementing the support apparatus 200 according to an embodiment of the present invention.

FIG. 17 is a diagram showing an example of the hardware configuration of a computer 50 serving as the support apparatus 200 and the metadata management server 202 according to an embodiment of the present invention. The computer 50 includes a main central processing unit (CPU) 1 and a main memory 4 connected to a bus 2. Removable storages (external storage systems in which recording media can be replaced), such as hard disk drives 13 and 30, CD-ROM drive 26 and 29, a flexible disk drive 20, an M0 drive 28, and a DVD drive 31, are connected to the bus 2 via a flexible disk controller 19, an IDE controller 25, or an SCSI controller 27.

Storage media, such as a flexible disk, an M0, a CD-ROM, and a DVD-ROM, are inserted into the removable storages. These storage media, the hard disks 13 and 30, and a ROM 14 can store computer program codes for giving commands to the CPU 1 in cooperation with an operating system to execute the present invention. That is, the foregoing storages can store a program that is installed in the computer 50 and that causes the computer 50 to function as the support apparatus 200 according to an embodiment of the present invention to support creation and management of metadata, as well as data, such as operation log information and raw metadata.

The program for supporting creation and management of metadata includes a generalization-target setting module, an operation-log recording module, a metadata creation module, a block extraction module, a similar-block search module, a metadata generalization module, a similar-metadata search module, and a metadata verification module. These modules work the CPU 1 to cause the computer 50 to function as the generalization-target setting section 205, the operation-log recording section 215, the metadata creation section 225, the block extraction section 230, the similar-block search section 235, the metadata generalizing section 245, the similar-metadata search section 280, and the metadata verification section 275. The computer program can be compressed or be divided into a plurality of pieces and stored in a plurality of media.

The computer 50 receives input from input devices, such as a keyboard 6 and a mouse 7, via a keyboard/mouse controller 5. The computer 50 receives input from a microphone 24 via an audio controller 21 or outputs voice from a speaker 23. The computer 50 is connected to a display 11 for presenting visual data to a user via a graphics controller 10. The computer 50 can be connected to a network via a network adaptor 18 (an Ethernet® card or a token-ring card) or the like and can communicate with another computer and so on.

It will be obvious to those skilled in the art from the above description that the computer 50 can be implemented by an information processing unit, such as a common personal computer, a workstation, and a main frame, or a combination thereof. The foregoing components are merely examples, and all the components are not absolutely necessary components of the present invention.

While the present invention has been described in its preferred embodiments, it is to be understood that the technical scope of the present invention is not limited to the embodiments. It is apparent to those skilled in the art that various changes and modifications can be made without departing from the spirit and scope of the present invention. Accordingly, it will also be obvious that such changes and modifications are also included in the technical scope of the present invention.

Note that the processes, such as the operations, procedures, steps, and stages of the devices, systems, programs, and methods shown in the Claims, specification, and drawings, can be achieved in any execution sequence, unless otherwise specified, such as "before" and "prior to", and unless the output of a previous process is used in a later process. Also note that if the output of a previous process is used in a later process, another process can be performed between the previous process and the later process and that even if another process is to be performed therebetween, the previous process may be changed to immediately before the later process. Even if the scope of the Claims, specification, and operation flows in the drawings are described using "first", "second", etc. for the purpose of convenience, it is not absolutely necessary to execute the operation in this order.

The invention claimed is:

1. A method for a computer to support creation and management of metadata for correcting a problem in a dynamic web application, the method comprising the steps of: by the computer, (a) creating metadata M1 in response to correction of a problem in a web application by a corrector, the metadata M1 including operation information indicating an operation for correcting the problem and application conditions of the operation information, and the application conditions including semantic block information including a location at which the problem has occurred in a Web page and a global variable group and cookie information that identify the state of the web application in which the problem has occurred;

(b) calculating metadata, for each of one or more blocks B0 that match the block information of the metadata M1 of blocks in the Web page that has shifted during a correction operation, with reference to an operation log on the web application by the corrector, the metadata including a global variable group and cookie information that identify the state of the web application that has output the Web page including the blocks B0; and (c) converting each of the global variable groups and the cookie information acquired for the metadata M1 and the individual blocks B0 to a key-value pair structure, extracting a common portion therefrom, and updating the global variable groups and the cookie information of the metadata M1 by using the extracted common portion.

2. The supporting method according to claim 1, wherein the calculation step (b) includes the substep (b-1) of, by the computer, presenting the one or more blocks B0 that match the block information of the metadata M1 to the corrector to prompt the corrector to select blocks SB to which the operation that the operation information of the metadata M1 indicates is applicable, wherein the computer calculates metadata including the global variable group and the cookie information for each of the selected blocks SB.

3. The supporting method according to claim 2, wherein the update step (c) includes the substep (c-1) of, by the computer, extracting a key included in common in all the global variable groups or all the cookie information and extracting a key-value pair structure in which a value corresponding to the extracted key is common in all the global variable group or all the cookie information as the common portion.

4. The supporting method according to claim 3, wherein the update step (c) includes the substep (c-2) of, by the computer, further converting each of the values of the elements of an array object included in the global variable group or the cookie information to a key-value pair structure including a key for extracting the element and the value of the element.

5. The supporting method according to claim 4, wherein the update step (c) includes the substep (c-3) of, by the computer, if a value corresponding to a key included in common in all the global variable group or all the cookie information is an array object, performing the substep (c-1) on the individual elements of the array object.

6. The supporting method according to claim 3, wherein the update step (c) includes the substep (c-4) of, by the computer, converting a hierarchical object included in the global variable group or the cookie information to a key-value pair structure by dealing with the hierarchical object as an array whose values are variables.

7. The supporting method according to claim 3, wherein in the update step (c), the computer converts the cookie information formed of single information to a key-value pair structure in which the key and the value are the same.

8. The supporting method according to claim 2, where in the creation step (a), the computer obtains values for a global variable group and cookie information of a type that is preset in the computer as being effective in identifying the state of the web application and uses the values as the application conditions of the metadata M1.

9. The supporting method according to claim 1, wherein the metadata for correcting a problem in a dynamic web application further includes location information that locates the problem in the block information as the application conditions, the method further comprising the steps of: by the computer, (d) creating, in response to location of the present problem in the web application by the corrector, block information including the location of the problem and location information that locates the problem in the block information;

(e) extracting matched metadata from a metadata storage section that stores metadata created in the past by using the created block information and location information as search keys and presenting the extracted metadata to the corrector to prompt the corrector to select metadata M0 that is applicable to the location of the present problem; and (f) creating metadata M2 for correcting the present problem in the web application with reference to operation information of the selected metadata M0.

10. The supporting method according to claim 9, further comprising the step of, by the computer, (g) updating the existing metadata M0 by generalizing the application conditions of the existing metadata M0 by using the metadata M2.

11. The supporting method according to claim 1, wherein the metadata for correcting a problem in a dynamic web application further includes, as the application conditions, address identification information that locates a Web page in which the problem has occurred, location information that locates the problem in the block information, and block identification information that locates the block information in the Web page at the occurrence of the problem, the method further comprising the steps of: by the computer, (h) calculating address information of the present Web page that the web application has output and a global variable group and cookie information that identify the present state of the web application;

(i) extracting matched metadata M0 from a metadata storage section that stores metadata created in the past by using the calculated address information, global variable group, and cookie information as search keys;

(j) comparing the block information of the extracted metadata M0 with a corresponding block in the Web page that the present web application has output, the corresponding block being extracted from the block identification information of the metadata M0, and if the blocks do not match, presenting the metadata M0 to the corrector to prompt the corrector to correct the metadata M0, and receiving the corrected block identification information; and (k) updating the existing metadata M0 by generalizing the block identification information of the metadata M0 by using the corrected block identification information.

* * * * *